United States Patent
Bhorkar et al.

(10) Patent No.: US 11,083,019 B2
(45) Date of Patent: *Aug. 3, 2021

(54) PARTIAL SUBFRAME TRANSMISSION IN LICENSED ASSISTED ACCESS

(71) Applicant: Apple Inc., Cupertino, CA (US)

(72) Inventors: Abhijeet Bhorkar, Fremont, CA (US); Hwan-Joon Kwon, Santa Clara, CA (US); Jeongho Jeon, San Jose, CA (US); Qiaoyang Ye, Fremont, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/889,636

(22) Filed: Jun. 1, 2020

(65) Prior Publication Data

US 2020/0404710 A1 Dec. 24, 2020

Related U.S. Application Data

(63) Continuation of application No. 15/767,812, filed as application No. PCT/US2016/036920 on Jun. 10, 2016, now Pat. No. 10,674,541.

(60) Provisional application No. 62/252,356, filed on Nov. 6, 2015, provisional application No. 62/256,014, filed on Nov. 16, 2015.

(51) Int. Cl.
| | |
|---|---|
| *H04W 74/08* | (2009.01) |
| *H04L 5/00* | (2006.01) |
| *H04W 16/14* | (2009.01) |
| *H04W 28/06* | (2009.01) |
| *H04W 72/04* | (2009.01) |

(52) U.S. Cl.
CPC ........ *H04W 74/0816* (2013.01); *H04L 5/005* (2013.01); *H04L 5/0092* (2013.01); *H04W 16/14* (2013.01); *H04W 28/065* (2013.01); *H04W 72/042* (2013.01); *H04L 5/0007* (2013.01); *H04L 5/0053* (2013.01); *H04W 74/0808* (2013.01)

(58) Field of Classification Search
None
See application file for complete search history.

(56) References Cited

U.S. PATENT DOCUMENTS

2013/0208587 A1* 8/2013 Bala ................. H04W 16/14
370/230

OTHER PUBLICATIONS

Indication of PDSCH in partial subframe—3GPP TSG RAN WG1, R1-152921 (May 25-29, 2015) (Year: 2015).*

(Continued)

*Primary Examiner* — Peter Chen
*Assistant Examiner* — Jeff Banthrongsack
(74) *Attorney, Agent, or Firm* — Eschweiler & Potashnik, LLC

(57) ABSTRACT

Techniques for communication of a partial subframe and properties related to the partial subframe of a plurality of subframes in licensed assisted access (LAA) for an unlicensed frequency band are discussed. A network device (e.g., an evolved NodeB, or other cell network device) can generate a listen before talk (LBT) protocol in order to determine whether an unlicensed carrier of a secondary cell device is idle or busy. The evolved Node B (eNB) can communicate starting or ending partial subframes in a downlink transmission, and a user equipment (UE) can process partial subframes based on the communications and a scheduling policy.

29 Claims, 15 Drawing Sheets

(56) References Cited

OTHER PUBLICATIONS

Candidate starting positions of partial subframe and corresponding RS pattern for LAA—3GPP TSG RAN WG1, R1-153787 (Aug. 24-28, 2015) (Year: 2015).*
On DL transmission detection and UL subframe indication for LAA—3GPP TSG RAN WG1, R1-155602 (Oct. 5 -9, 2015) (Year: 2015).*
Partial subframe for LAA—3GPP TSG RAN WG1, R1-155474 (Oct. 5-9, 2015) (Year: 2015).*
International Preliminary Report on Patentability dated May 8, 2018 for International Application PCT/US2016/036920.
International Search Report dated Aug. 19, 2016 for International Application PCT/US2016/036920.
"Indication of PDSCH in partial subframe." Source: Panasonic. Agenda Item: 6.2.4.3. 3GPP TSG RAN WG1 Meeting #81, Fukuoka, Japan, May 25-29, 2015. R1-152921. 4 pages.
"On DL transmission detection and UL subframe indication for LAA." Source: Nokia Networks. Agenda Item: 7.2.3.3. 3GPP TSG RAN WG1 Meeting #82bis, Malmoe, Sweden, Oct. 5-9, 2015. R1-155602. 6 pages.
"Partial subframe for LAA." Source: Samsung. Agenda Item: 7.2.3.3. 3GPP TSG RAN WG1 #82bis, Malmo, Sweden, Oct. 5-9, 2015. R1-155474. 6 pages.
"Candidate starting positions of partial subframe and corresponding RS pattern for LAA." Source: Huawei, HiSilicon. Agenda Item: 7.2.4.3. 3GPP TSG RAN WG1 Meeting #82, Beijing, China, Aug. 24-28, 2015. R1-153787.
European Office Action dated Apr. 29, 2019 for EP Application No. 16730990.5-1219.
Non-Final Office Action dated Jul. 12, 2019 in connection with U.S. Appl. No. 15/767,812.
Notice of Allowance dated Jan. 28, 2020 in connection with U.S. Appl. No. 15/767,812.

* cited by examiner

PARTIAL SUBFRAME TRANSMISSION IN LICENSED ASSISTED ACCESS

REFERENCE TO RELATED APPLICATIONS

This application is a continuation of U.S. patent application Ser. No. 15/767,812 filed on Apr. 12, 2019, which is a National Phase entry application of International Patent Application No. PCT/US2016/036920 filed Jun. 10, 2016, which claims priority to U.S. Provisional Application 62/252,356 filed on Nov. 6, 2015, entitled "INDICATING THE CURRENT AND THE FOLLOWING SUBFRAME LENGTHS AND THE ENDING SUBFRAME" in the name of Jeongho Jeon et al. and U.S. Provisional Application 62/256,014 filed on Nov. 16, 2015, entitled "SIGNALING PARTIAL SUBFRAME TRANSMISSION IN LICENSED ASSISTED ACCESS" in the name of Abhijeet Bhorkar et al. and is hereby incorporated by reference in its entirety.

FIELD

The present disclosure relates to wireless technology, and more specifically to techniques for signaling subframe transmissions including a partial subframe transmissions and a subframe transmission length in licensed assisted access.

BACKGROUND

The scarcity of licensed spectrum for cellular communications below 6 GHz has driven interest in unlicensed bands for long term evolution (LTE) operation. In particular, the less crowded 5 GHz bands (currently used mostly for WiFi) have been proposed for LTE deployment, offering the potential for a substantial increase in LTE throughput. Overall, the design principles for LTE-U (LTE in Unlicensed spectrum) include integration with the licensed spectrum, minimal change to the existing LTE air-interface, and guaranteed co-existence with other systems using unlicensed spectrum, such as WiFi. Recently, licensed assisted access (LAA) is a new technology considered in LTE Release 13 to meet the ever increasing demand for high data rate in wireless cellular networks by utilizing the carrier aggregation feature supported in LTE-A (LTE Advanced) to combine the data transmission over licensed primary carrier and unlicensed secondary component carriers. The 5 GHz band is of current interest in 3GPP (the Third Generation Partnership Project). For fair coexistence with the incumbent systems at the 5 GHz band, such as IEEE (the Institute of Electrical and Electronics Engineers) 802.11 based wireless local area networks (WLAN), Listen-Before-Talk (LBT) at eNB is considered as a feature of Release 13 LAA system.

DETAILED DESCRIPTION

Figure 1:
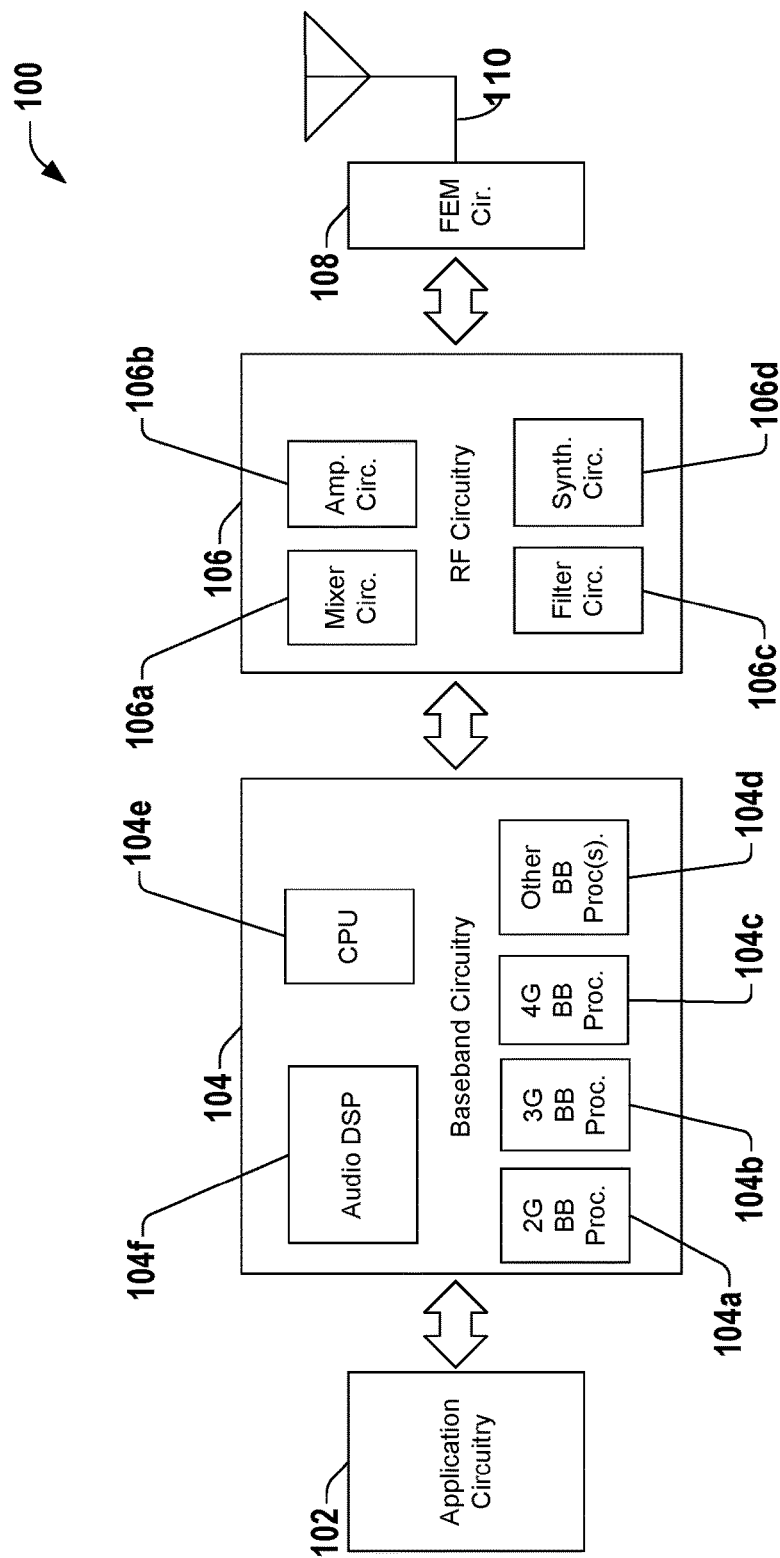
FIG. 1 is a block diagram illustrating an example network device useable in connection with various aspects or embodiments described herein.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (UE) (e.g., mobile/wireless phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising."

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

According to some techniques, for unlicensed band transmission, category 4 LBT protocol mechanism can be utilized at least for LAA downlink (DL) transmission bursts containing a physical downlink shared channel (PDSCH). With category 4 LBT, LAA evolved NodeB (eNB) can sense the physical channel (e.g., PDSCH) and perform DL transmission at any time instant if the channel assessment indicates and idle channel. The channel assessment can be an extended clear channel assessment or a standard clear channel assessment in criteria to determine an idleness or business of an unlicensed spectrum channel.

In addition, it could be advantageous that a transmission start of the transmission burst for DL be aligned with a primary cell (PCell) (e.g., an eNB or other network device) subframe boundary, as the Release-12 CA mechanism mandates aligned transmission over the PCell and a secondary cell (e.g., a secondary cell network device, a WiFi network device, or other network device). If such a PCell alignment restriction is enforced, the interval from the ending of the LBT until the PCell subframe boundary could be utilized and otherwise wasted for data transmission. In this regard, a partial time transmission interval (TTI) can be described on a subset of orthogonal frequency-division multiplexing (OFDM) symbols within DL subframe, while still maintaining the PCell aligned timing relationship for DL burst transmission.

With a partial subframe, even though it could be possible for an eNB to transmit immediately after completing the LBT, the eNB can be configured to start PDSCH transmission at certain known OFDM symbol positions within a subframe with respect to a PCell subframe boundary to thereby limit the UE blind detection complexity in determining the starting/ending positions of DL transmission burst. Limiting the starting positions within the subframe could also help reduce eNB scheduling complexity, as the eNB could a priori prepare partial subframes for all or a subset less than all possible starting positions. As such, blind detection could occur without any indication directly or explicitly of parameters or properties of a partial subframe and be a result of processing a number of possibilities for a given parameter or property of the partial subframe (e.g., duration time, length, number of symbols, boundary location, or the like) that is either based on an inference from other information or a trial and error process of elimination, for example.

As part of the disclosure herein, the first subframe in the DL burst can be referred to as the starting partial subframe, if the number of symbols within the first subframe is less than 14 symbols and the subframe does not start at the PCell subframe boundary. In addition, the last subframe in the DL burst can be referred to as ending partial subframe, if the number of symbols within the last subframe is less than 14 symbols and the subframe starts at the PCell subframe boundary, but does not end at the boundary.

Embodiments described herein can be implemented into a system using any suitably configured hardware and/or software. FIG. 1 illustrates, for one embodiment, example components of a cell network device 100, such as a base station, a macro cell network device, a secondary cell network device, a small cell network device, an evolved/enhanced NodeB (eNB), or any other network device (e.g. a user equipment, pico cell, Femto cell or the like). In some embodiments, the cell network device 100 can include application circuitry 102, baseband circuitry 104, Radio Frequency (RF) circuitry 106, front-end module (FEM) circuitry 108 and one or more antennas 110, coupled together at least as shown.

The application circuitry 102 can include one or more application processors. For example, the application circuitry 102 can include circuitry such as, but not limited to, one or more single-core or multi-core processors. The processor(s) can include any combination of general-purpose processors and dedicated processors (e.g., graphics processors, application processors, etc.). The processors can be coupled with and/or can include memory/storage and can be configured to execute instructions stored in the memory/storage to enable various applications and/or operating systems to run on the system.

The baseband circuitry 104 can include circuitry such as, but not limited to, one or more single-core or multi-core processors. The baseband circuitry 104 can include one or more baseband processors and/or control logic to process baseband signals received from a receive signal path of the RF circuitry 106 and to generate baseband signals for a transmit signal path of the RF circuitry 106. Baseband processing circuitry 104 can interface with the application circuitry 102 for generation and processing of the baseband signals and for controlling operations of the RF circuitry 106. For example, in some embodiments, the baseband circuitry 104 can include a second generation (2G) baseband processor 104a, third generation (3G) baseband processor 104b, fourth generation (4G) baseband processor 104c, and/or other baseband processor(s) 104d for other existing generations, generations in development or to be developed in the future (e.g., fifth generation (5G), 6G, etc.). The baseband circuitry 104 (e.g., one or more of baseband processors 104a-d) can handle various radio control functions that enable communication with one or more radio networks via the RF circuitry 106. The radio control functions can include, but are not limited to, signal modulation/demodulation, encoding/decoding, radio frequency shifting, etc. In some embodiments, modulation/demodulation circuitry of the baseband circuitry 104 can include Fast-Fourier Transform (FFT), precoding, and/or constellation mapping/demapping functionality. In some embodiments, encoding/decoding circuitry of the baseband circuitry 104 can include convolution, tail-biting convolution, turbo, Viterbi, and/or Low Density Parity Check (LDPC) encoder/decoder functionality. Embodiments of modulation/demodulation and encoder/decoder functionality are not limited to these examples and can include other suitable functionality in other embodiments.

In some embodiments, the baseband circuitry 104 can include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 104e of the baseband circuitry 104 can be configured to run elements of the protocol stack for signaling of the PHY, MAC, RLC, PDCP and/or RRC layers. In some embodiments, the baseband circuitry can include one or more audio digital signal processor(s) (DSP) 104f. The audio DSP(s) 104f can be include elements for compression/decompression and echo cancellation and can include other suitable processing elements in other embodiments. Components of the baseband circuitry can be suitably combined in a single chip, a single chipset, or disposed on a same circuit board in some embodiments. In some embodiments, some or all of the constituent components of the baseband circuitry 104 and the application circuitry 102 can be implemented together such as, for example, on a system on a chip (SOC).

In some embodiments, the baseband circuitry 104 can provide for communication compatible with one or more radio technologies. For example, in some embodiments, the baseband circuitry 104 can support communication with an evolved universal terrestrial radio access network (EU-TRAN) and/or other wireless metropolitan area networks (WMAN), a wireless local area network (WLAN), a wireless personal area network (WPAN). Embodiments in which the baseband circuitry 104 is configured to support radio communications of more than one wireless protocol can be referred to as multi-mode baseband circuitry.

RF circuitry 106 can enable communication with wireless networks using modulated electromagnetic radiation through a non-solid medium. In various embodiments, the RF circuitry 106 can include switches, filters, amplifiers, etc. to facilitate the communication with the wireless network. RF circuitry 106 can include a receive signal path which can include circuitry to down-convert RF signals received from the FEM circuitry 108 and provide baseband signals to the baseband circuitry 104. RF circuitry 106 can also include a transmit signal path which can include circuitry to up-convert baseband signals provided by the baseband circuitry 104 and provide RF output signals to the FEM circuitry 108 for transmission.

In some embodiments, the RF circuitry 106 can include a receive signal path and a transmit signal path. The receive signal path of the RF circuitry 106 can include mixer circuitry 106a, amplifier circuitry 106b and filter circuitry 106c. The transmit signal path of the RF circuitry 106 can include filter circuitry 106c and mixer circuitry 106a. RF circuitry 106 can also include synthesizer circuitry 106d for synthesizing a frequency for use by the mixer circuitry 106a of the receive signal path and the transmit signal path. In some embodiments, the mixer circuitry 106a of the receive signal path can be configured to down-convert RF signals received from the FEM circuitry 108 based on the synthesized frequency provided by synthesizer circuitry 106d. The amplifier circuitry 106b can be configured to amplify the down-converted signals and the filter circuitry 106c can be a low-pass filter (LPF) or band-pass filter (BPF) configured to remove unwanted signals from the down-converted signals to generate output baseband signals. Output baseband signals can be provided to the baseband circuitry 104 for further processing. In some embodiments, the output baseband signals can be zero-frequency baseband signals, although this is not a requirement. In some embodiments, mixer circuitry 106a of the receive signal path can comprise passive mixers, although the scope of the embodiments is not limited in this respect.

In some embodiments, the mixer circuitry 106a of the transmit signal path can be configured to up-convert input baseband signals based on the synthesized frequency provided by the synthesizer circuitry 106d to generate RF output signals for the FEM circuitry 108. The baseband signals can be provided by the baseband circuitry 104 and can be filtered by filter circuitry 106c. The filter circuitry 106c can include a low-pass filter (LPF), although the scope of the embodiments is not limited in this respect.

In some embodiments, the mixer circuitry 106a of the receive signal path and the mixer circuitry 106a of the transmit signal path can include two or more mixers and can be arranged for quadrature down-conversion or up-conversion respectively. In some embodiments, the mixer circuitry 106a of the receive signal path and the mixer circuitry 106a of the transmit signal path can include two or more mixers and can be arranged for image rejection (e.g., Hartley image rejection). In some embodiments, the mixer circuitry 106a of the receive signal path and the mixer circuitry 106a can be arranged for direct down-conversion or direct up-conversion, respectively. In some embodiments, the mixer circuitry 106a of the receive signal path and the mixer circuitry 106a of the transmit signal path can be configured for super-heterodyne operation.

In some embodiments, the output baseband signals and the input baseband signals can be analog baseband signals, although the scope of the embodiments is not limited in this respect. In some alternate embodiments, the output baseband signals and the input baseband signals can be digital baseband signals. In these alternate embodiments, the RF circuitry 106 can include analog-to-digital converter (ADC) and digital-to-analog converter (DAC) circuitry and the baseband circuitry 104 can include a digital baseband interface to communicate with the RF circuitry 106.

In some dual-mode embodiments, a separate radio IC circuitry can be provided for processing signals for each spectrum, although the scope of the embodiments is not limited in this respect.

In some embodiments, the synthesizer circuitry 106d can be a fractional-N synthesizer or a fractional N/N+1 synthesizer, although the scope of the embodiments is not limited in this respect as other types of frequency synthesizers can be suitable. For example, synthesizer circuitry 106d can be a delta-sigma synthesizer, a frequency multiplier, or a synthesizer comprising a phase-locked loop with a frequency divider.

The synthesizer circuitry 106d can be configured to synthesize an output frequency for use by the mixer circuitry 106a of the RF circuitry 106 based on a frequency input and a divider control input. In some embodiments, the synthesizer circuitry 106d can be a fractional N/N+1 synthesizer.

In some embodiments, frequency input can be provided by a voltage controlled oscillator (VCO), although that is not a requirement. Divider control input can be provided by either the baseband circuitry 104 or the applications processor 102 depending on the desired output frequency. In some embodiments, a divider control input (e.g., N) can be determined from a look-up table based on a channel indicated by the applications processor 102.

Synthesizer circuitry 106d of the RF circuitry 106 can include a divider, a delay-locked loop (DLL), a multiplexer and a phase accumulator. In some embodiments, the divider can be a dual modulus divider (DMD) and the phase accumulator can be a digital phase accumulator (DPA). In some embodiments, the DMD can be configured to divide the input signal by either N or N+1 (e.g., based on a carry out) to provide a fractional division ratio. In some example embodiments, the DLL can include a set of cascaded, tunable, delay elements, a phase detector, a charge pump and a D-type flip-flop. In these embodiments, the delay elements can be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 106d can be configured to generate a carrier frequency as the output frequency, while in other embodiments, the output frequency can be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency can be a LO frequency (fLO). In some embodiments, the RF circuitry 106 can include an IQ/polar converter.

FEM circuitry 108 can include a receive signal path which can include circuitry configured to operate on RF signals received from one or more antennas 110, amplify the received signals and provide the amplified versions of the received signals to the RF circuitry 106 for further processing. FEM circuitry 108 can also include a transmit signal path which can include circuitry configured to amplify signals for transmission provided by the RF circuitry 106 for transmission by one or more of the one or more antennas 110.

In some embodiments, the FEM circuitry 108 can include a TX/RX switch to switch between transmit mode and receive mode operation, or operate concurrently/simultaneously. The FEM circuitry can include a receive signal path and a transmit signal path. The receive signal path of the FEM circuitry can include a low-noise amplifier (LNA) to amplify received RF signals and provide the amplified received RF signals as an output (e.g., to the RF circuitry 106). The transmit signal path of the FEM circuitry 108 can include a power amplifier (PA) to amplify input RF signals (e.g., provided by RF circuitry 106), a processor and one or more filters to generate RF signals for subsequent transmission (e.g., by one or more of the one or more antennas 110.

In some embodiments, the cell network device 100 can include additional elements such as, for example, one or more processors, memory/storage, display, camera, sensor, and/or input/output (I/O) interface.

Embodiments disclosed herein can be enabled or facilitated by one or more components (e.g., FEM circuitry 108 or otherwise) of the cell network device 100 to signal, process, or generate an indication of starting partial subframes or ending partial subframes of a DL transmission. The amount of information for LAA operations at the UE can be different for the starting and the ending partial subframes; for a starting partial subframe, the ending position can be aligned with the PCell subframe boundary, but the starting position is unknown to UE, while for the ending partial subframe, the opposite could be true. For both types of the partial subframes, it can be sufficient for the UE to process or receive (implicit or explicit) indication regarding the duration (# of OFDM symbols) of the partial subframe, or for an eNB to generate or transmit such indication.

Figure 2:
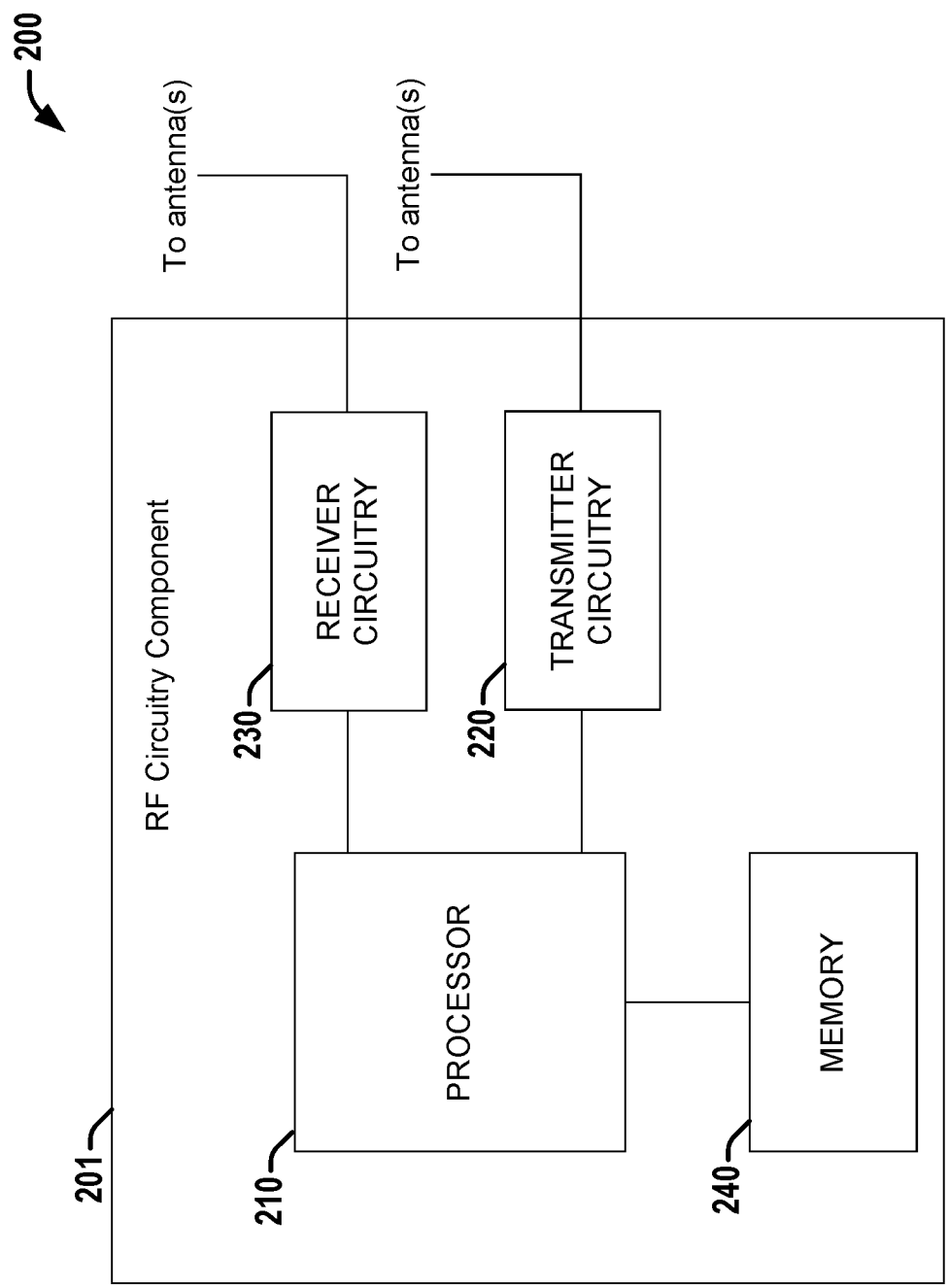
FIG. 2 is a block diagram of a system or device employable in an enhanced or evolved Node B (eNB), other base station, or a UE that facilitates listen before talk (LBT) for discovery reference signal (DRS) transmission in unlicensed spectrum and indication of a partial/regular subframe within a downlink licensed assisted access (LAA) transmission burst according to various aspects or embodiments described herein.

FIG. 2 further illustrates details a block diagram of a device or system 200 to be employed in an eNB, a UE or other network device that facilitates or enables an LBT protocol for an LAA unlicensed band according to various aspects described herein. System 200 can include a radio frequency (RF) circuitry component 201 with a processor 210, transmitter circuitry 220, receiver circuitry 230, and memory 240, which can be similar to the FEM circuitry 108 of the network device 100 of FIG. 1. In various aspects, system 200 can be included within an Evolved Universal Terrestrial Radio Access Network (E-UTRAN) Node B (Evolved Node B, eNodeB, or eNB), other base station, network access point, a secondary cell network device (e.g., a small cell, WiFi network device, or a UE) or other cell network component/device in a wireless communications network. Memory 240 also can include instructions that can be implemented by processor 210, transmitter circuitry 220, and/or receiver circuitry 230 to implement various aspects described herein.

In addition, the memory 240 can comprise one or more machine-readable medium/media including instructions that, when performed by a machine or component herein cause the machine to perform acts of the method or of an apparatus or system for concurrent communication using multiple communication technologies according to embodiments and examples described herein. It is to be understood that aspects described herein can be implemented by hardware, software, firmware, or any combination thereof. When implemented in software, functions can be stored on or transmitted over as one or more instructions or code on a computer-readable medium (e.g., the memory described herein or other storage device). Computer-readable media includes both computer storage media and communication media including any medium that facilitates transfer of a computer program from one place to another. A storage media or a computer readable storage device can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or other tangible and/or non-transitory medium, that can be used to carry or store desired information or executable instructions. Also, any connection is properly termed a computer-readable medium. For example, if software is transmitted from a website, server, or other remote source using a coaxial cable, fiber optic cable, twisted pair, digital subscriber line (DSL), or wireless technologies such as infrared, radio, and microwave, then coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. As described in greater detail below, system 200 can facilitate LBT and DL transmission burst with a DRS for LAA operation in the unlicensed frequency band.

Processor 210 can, in accordance with various embodiments described herein, generate techniques can be employed to facilitate downlink transmission LAA for unlicensed band operation in a wireless network by the network device 100 or 200, for example. In an LTE network system, for example, if a small cell is considered as the secondary cell (SCell) by all UEs served by it, this small cell can perform state transition between ON/OFF. The Rel-12 discovery reference signal (DRS) can facilitate fast transition from OFF state to ON state, by transmitting minimal signals for radio resource measurements (RRMs) and enable measurement or data reporting during the OFF state. DRS includes primary synchronization signal (PSS), secondary synchronization signal (SSS), CRS, as well as optionally the CSI-RS. DRS measurement timing configuration (DMTC) can be configured by the network device 100 (e.g., an eNB or other cell network device), which can have an occasion of 6 milliseconds (ms) and a periodicity of 40 ms, 80 ms or 160 ms for the occasion to be utilized. UEs communicatively coupled to the network device 100 or 200 can expect DRS to be received within these parameters or others related to the DMTC.

In some embodiments of the communication system or network device 200, an indication of the starting/ending partial subframe of a DL transmission burst can be performed, with indication or signaling being explicitly or implicitly generated with a plurality of subframes of a downlink transmission (e.g., from an eNB to a UE) for starting partial subframes, ending partial subframes or both. In particular, the starting position and the duration of the starting partial subframe can be implicitly detected based on the number of CRS symbols or detection of the start of (E)PDCCH within the partial subframe without any explicit indication (as an implicit indication). Alternatively or additionally, the duration of a partial subframe can be conveyed in the (E)PDCCH within the subframe following the partial subframe (as an explicit indication). Further, the presence and duration of a partial subframe can be conveyed via different sequences for CRS within the partial subframe.

In embodiments related to implicit indication, processing or generation, the network device 100 can operate to enable a blind detection of the number of CRS symbols within a subframe for determination of parameters such as the duration of a partial/regular subframe or the starting position of a partial (starting) subframe, which cab depend on a choice made of the possible starting positions by the network device 100 or 200. This choice can be generated according to a predetermined interval that can include a time between an ending of the LBT protocol and an aligned starting position/boundary for a regular subframe among subframes of the downlink transmission, for example. As described above, blind detection can be performed for a range possible choices of symbols that could have been used for forming the partial subframe, meaning that the network device/system 100 or 200 can perform an exhaustive, or complete search for all possible subframe durations for a physical downlink channel decoding, and thereby infer that the duration of partial subframe corresponds to the hypothesis for which the physical downlink channel was correctly decoded.

Alternatively or additionally in another embodiment, the network device 100 or 200 can operate to enable blind detection of the start of (E)PDCCH within a DL transmission burst for the determination of the duration of the partial subframe; the UE can compute the partial subframe interval as an interval from the start of (E)PDCCH to the next PCell subframe boundary. In another embodiment related to implicit indication, the network device 100 or 200 or any component thereof can utilize an explicit indication according to various techniques to indicate the starting partial subframe. The network device 100 or 200, for example, can utilize downlink control information (DCI) or the physical control format indicator channel (PCFICH) in the partial subframe or a next regular subframe (a subframe that is not partial) as an explicit indication of the duration of the starting partial subframe.

Alternatively or additionally, the network device 100 or 200 can utilize a modification of CRS within the partial subframe for signaling additional information regarding the presence and duration of the starting partial subframe, such as, for example, introducing a new or different CRS sequence based on a duration of the partial subframe.

Other embodiments can pertain to signaling for the ending partial subframe, either explicitly or implicitly. The presence and duration of the ending partial subframe can be detected based on a number of symbols occupied by CRS without any explicit indication. As an explicit indication, the presence and duration of the ending partial subframe can be conveyed in the PDCCH/PCFICH/CRS within the partial subframe.

In one embodiment of ending partial subframe signaling, an implicit indication can include the network device 100 or 200 or components thereof generating a detection of the number of CRS symbols within the partial ending subframe.

In other embodiments of ending partial subframe signaling (via the network device 100 or 200 or its component(s)) involving explicit indication, an indication could be provided within every subframe of a DL burst on a normal (regular)/partial subframe, which can also additionally or alternatively have an indication in the ending partial subframe of a DL burst indicating or referring to an ending position of the subframe (e.g., the last ending boundary or end of the DL transmission).

In another embodiment, an indication can be provided only in the ending partial subframe of a DL burst indicating or referring to the ending position of the subframe. In another embodiment, an indication can be provided in every subframe of a DL burst indicating or referring to the number of OFDM symbols within each subframe. Another embodiment, can account for an indication in the first subframe of a DL burst to indicate the total number of OFDM symbols within the DL burst. In another option, an indication can be provided in every subframe or a subset of subframes of a DL burst on the total number of remaining OFDM symbols, such as less than all subframes, but more than one (partial or regular subframe), for example.

Figure 3:
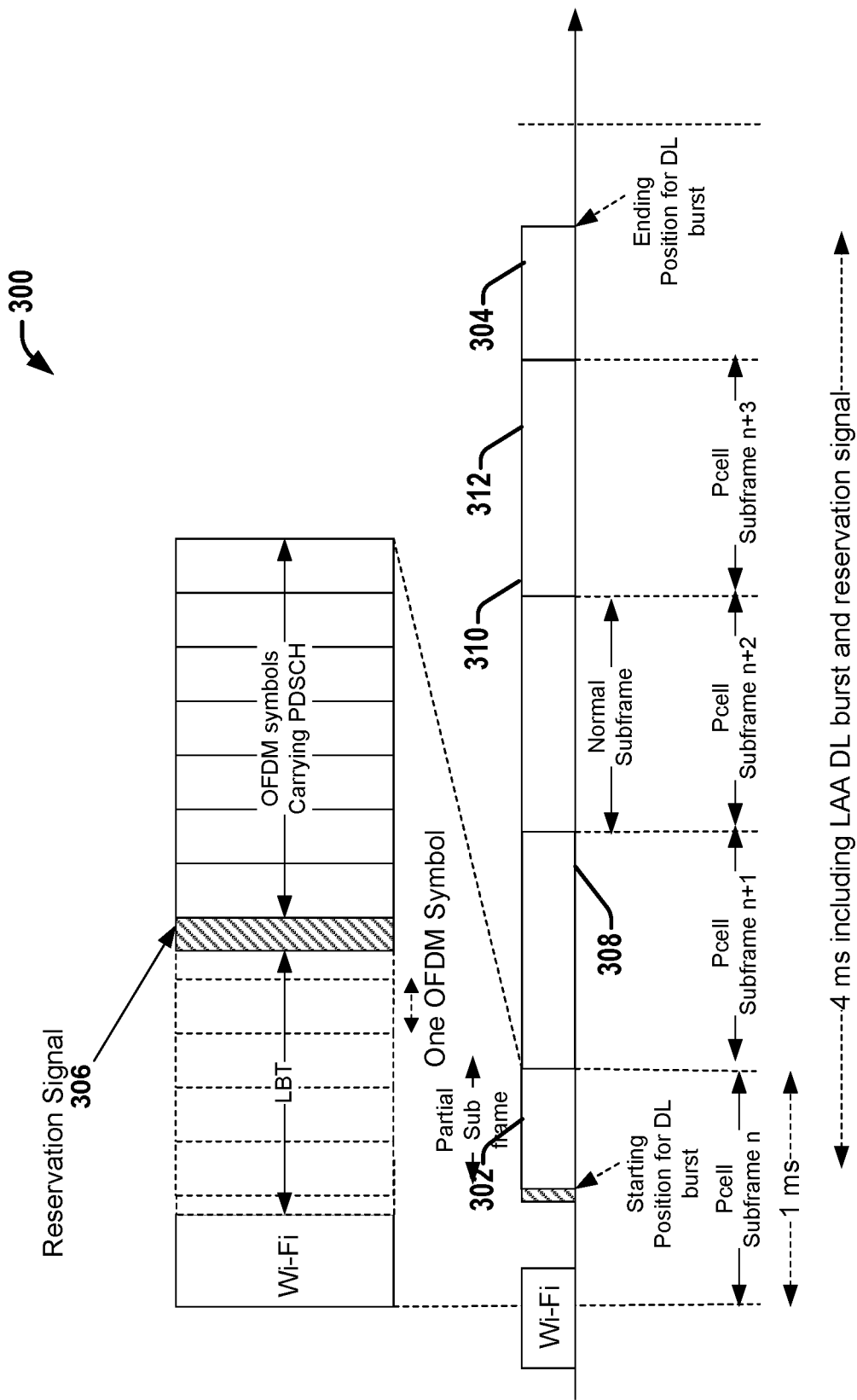
FIG. 3 is a diagram illustrating an example of a downlink LAA transmission with explicit or implicit indication of partial/normal subframes in accordance with various aspects described herein.

FIG. 3 illustrates an example DL burst transmission with a partial subframe in accordance with various aspects or embodiments described herein. As LBT can be completed at any time before the allowed starting positions, the LAA eNB (e.g., 100 or 200) can reserve the channel immediately after the completion of LBT until the allowed starting position of DL transmission via a reserve (or reservation) signal 306. If the starting position is not aligned with the PCell boundary, then the transmission of the DL transport block starts with a partial subframe 302 and ends with a partial subframe 304. The duration of the starting/ending partial subframe can be dependent on the choice of starting/ending positions made randomly by the eNB (e.g., 100 or 200) within the specified time frame of reservation or other signalling, for example.

Embodiments herein can take into account several aspects of various observations. For example, performance improvements for LAA and WiFi can be maximized if the possible starting positions of the DL data burst transmissions are spaced evenly (or at similar spacing) within a subframe. It is possible that in some cases equal spaces between the possible starting positions could not be possible due to the limitations on the number of available OFDM symbols. Additionally, performance improvement becomes marginal as the number of allowed starting positions is further increased beyond a certain number. As such, slot boundaries (i.e. OFDM symbols $\{0, 7\}$ for a normal cyclic prefix (CP)) can be chosen as a trade-off between the complexity and performance improvement. Note, however, that starting positions $\{0, 7\}$ could be considered as a one particular choice for DL transmission. Other possible choices for the set of starting positions can include, but are not limited to, $\{0, 3\}$, $\{0, 5, 10\}$, $\{0, 4, 7, 11\}$, $\{0, 3, 6, 9, 12\}$, $\{0, 2, 4, 6, 8, 10, 12\}$. As such, any subset of the set $\{n, 0 \le n \le 13\}$ can be considered as a set of possible starting positions or possible choices, which can be randomly determined within the predetermined set or interval.

The starting position of the DL burst can also be further restricted by a choice of a scheduling policy (i.e., self-scheduling or cross-carrier scheduling) used for assigning the resources of a subframe. If self-carrier scheduling is used for the DL assignment as selected by the eNB (e.g., 100 or 200), then the eNB 100 can choose any of the possible starting positions as discussed above. However, in case of a cross-carrier scheduling, the physical downlink control channel (PDCCH) or enhanced (E)PDCCH can be transmitted on the PCell, and thus the starting position of the (E)PDCCH on the PCell can be restricted to the PCell subframe boundary to maintain any legacy operation. This implies that the eNB already has completed the LBT on the unlicensed SCell before transmission of the (E)PDCCH on the PCell, which can generally occur at or about the subframe boundary. Thus, the starting position could be restricted to symbol 0 when the eNB 100 schedules the resources of the first subframe with a cross-carrier scheduling policy.

The ending OFDM position can be computed as a function of a reservation signal duration and the starting position of a DL burst such that the total DL transmission duration does not exceed the maximum channel occupancy time (MOOT) limit. Thus, depending on the duration of the reservation signal and the LBT completion instant, an ending OFDM symbol position can be any of symbol 0 to symbol 13 in the case of normal CP. The ending position can be generally determined based on the existing downlink pilot time slot (DwPTS) design. Possible ending position based on an existing DwPTS configuration is limited to symbols $\{2, 5, 8, 9, 10, 11\}$ for normal CP making it in total 6 possible ending positions in addition to a normal subframe. The ending subframe positions based on the existing DwPTS framework should not be considered in restrictive sense. In principle, a subframe ending in any of the 14 symbols within a subframe can be considered as a valid ending partial subframe. Further, there should be a negligent impact on the choice of the ending position due to the scheduling method (i.e. self or cross-carrier scheduling).

In addition UEs associated with the LAA eNB could also be made to determine the presence of a partial subframe at the start 302 or the end 304 of the DL burst for the purposes of PDSCH decoding and channel state information (CSI) reporting. As such, scheduled UEs within the partial subframe 302 or 304 can be informed (implicitly or explicitly) about the duration of partial subframe(s) for the purposes of demodulating/decoding PDSCH within the partial subframe. If the scheduled UE (e.g., 100 or 200) does not know the duration of the partial subframe 302 or 304, the UE may not correctly decode PDSCH as the number of symbols and transport block sizes (TBS) used for PDSCH transmission remain unknown to the UE. It is possible that UE 100 or 200 can perform blind detection for the possible choices of symbols that may have been used for forming the partial subframe, i.e. the UE performs exhaustive search for all possible subframe durations for PDSCH decoding, and thereby the UE can infer that the duration of partial subframe corresponds to the hypothesis for which PDSCH was correctly decoded. However, such a complicated method as blind detection can impose significant decoding complexity at the UE 100 or 200. Thus, it could be advantageous in reducing complexity and cost that the duration of partial subframe can be indicated explicitly or implicitly to the scheduled UEs.

For the purposes of CSI computation and reporting, all UEs may need to be informed about the presence and/or location of cell-specific reference signals (CRS) and/or CSI-reference signals (CSI-RS) within a partial subframe, as the number of such reference symbols can vary depending on the duration of the partial subframe. If the reference symbols to be used for CSI computation are not known to UEs 100 or 200, a UE 100 or 200 may incorrectly perform CSI computation by considering the symbols over which RS is not transmitted. One possible option is to inform all the UEs within a coverage area about the presence of the partial subframe 302 or 304. Thus, UEs can then skip the CSI measurements on the partial subframe 302 or 304. However, with this option, UEs 200 could lose a CSI update opportunity and, thus, explicit indication of start/end/duration of partial subframes could be advantageous. The signalling and processing of an indication or indication information can be applicable to starting and ending subframes based on protocols or configuration details also presented in accordance with FIGS. 12 and 13. As such different techniques are proposed in this disclosure for signalling the indication of starting and ending partial subframes 302 and 304, which can include OFDM symbols that are less than a regular subframe 308-312 among a plurality of subframes of a single DL transmission sequence 300. Alternatively, a partial subframe could also include the same number of OFDM symbols as the regular subframes 308-312 herein.

While the methods described within this disclosure are illustrated in and described herein as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the description herein. Further, one or more of the acts depicted herein may be carried out in one or more separate acts and/or phases.

Figure 4:
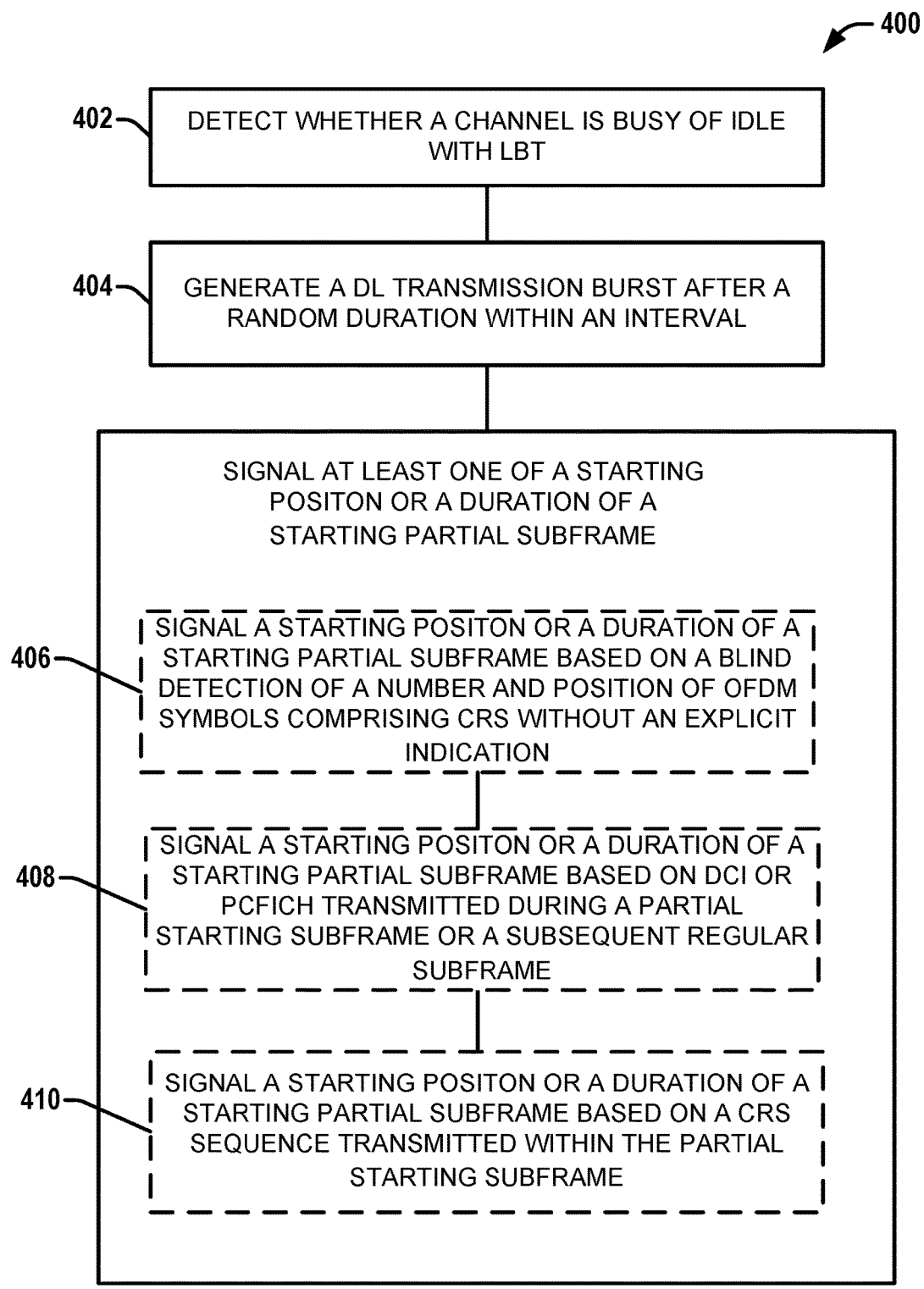
FIG. 4 is a flow diagram illustrating a method of enabling generation or processing of indication(s) of a partial/regular subframe within a downlink LAA transmission burst according to various aspects or embodiments described herein.

Referring to FIG. 4, illustrated is an example process flow for indicating a starting partial subframe via LAA in the DL to enable high data rates and alignment over a licensed primary carrier or PCell and an unlicensed secondary carrier or SCell communication. Explicit indication of the ending position or the duration of the partial subframe can be provided via DCI within (E)PDCCH, PCFICH or a different CRS sequence generation. For example, the possible ending positions can be limited to {0, 7} for a normal CP, while for the extended CP possible ending positions can be limited to {0, 6}. When cross-carrier scheduling is used, the first subframe within the DL burst can only be a normal subframe. Thus, embodiments for various methods indicating the starting partial subframe can be applicable to self-carrier scheduling. However, the choice of starting positions due to the scheduling method or process flow is not limit as one of ordinary skill in the art can appreciate.

In one embodiment, blind detection of a number of CRS symbols within a partial subframe can be performed via the UE (e.g., network device 200) according to interaction with the eNB (e.g., network device 100). By performing the blind detection for the number of CRS symbols within a subframe, the UE 200 can differentiate between the partial subframe and regular subframe without an explicit indication from the eNB 100. In addition, UE 200 can obtain a duration of the partial subframe based on the blind detection of the positions of CRS symbols within the partial subframe. Note that for a normal subframe, the possible CRS positions are OFDM symbols {0, 4, 7, 11} for ports (antenna ports) 0/1 and symbols {1, 8} for ports 2/3.

In another embodiment, if the possible starting positions are limited to {0, 7}, for example, and this is known to the UE 200 beforehand such as via RRC signalling from the eNB 100, for example, then the detection of 2 CRS symbols present in the second slot out of the possible 4 CRS symbols for port 0/1 can imply that it is a partial subframe consisting of 7 symbols. Alternatively or additionally, if the possible starting positions are limited to {0, 4, 7, 11}, then UEs could infer that the partial subframe starting position is symbol 11, if the UE detects CRS only at OFDM symbol 11, for example.

The method 400 for a transmission or indication of a partial subframe in a wireless communication network or can initiate at 402 with the eNB performing listen-before-talk (LBT) with an extended clear channel assessment (CCA) or CCA operation or techniques. For example, the CCA can include operations for detecting a DL transmission opportunity of the unlicensed carrier using network information or a random (pseudo-random) number, for example. The eNB 100 can sense the channel to determine if the channel is busy or idle, and at 404 transmit after a random duration that is specified or predetermined within a given interval. A partial subframe can be present at one or more of the start or end of a DL transmission burst, for example. The partial subframe can include OFDM symbols that are less than or equal to in number as that of a currently defined (by 3GPP) LTE normal subframe (or regular subframe).

At 406, signaling the DL transmission burst can comprise a starting position of a starting partial subframe, a duration of the starting partial subframe or both. The signaling can be based on one or more options at 406-410. For example, at 406 signaling for indicating the starting position/duration of the starting partial subframe can be based on the blind detection of the number and the positions of OFDM symbols with CRS without any explicit indication.

Figure 5:
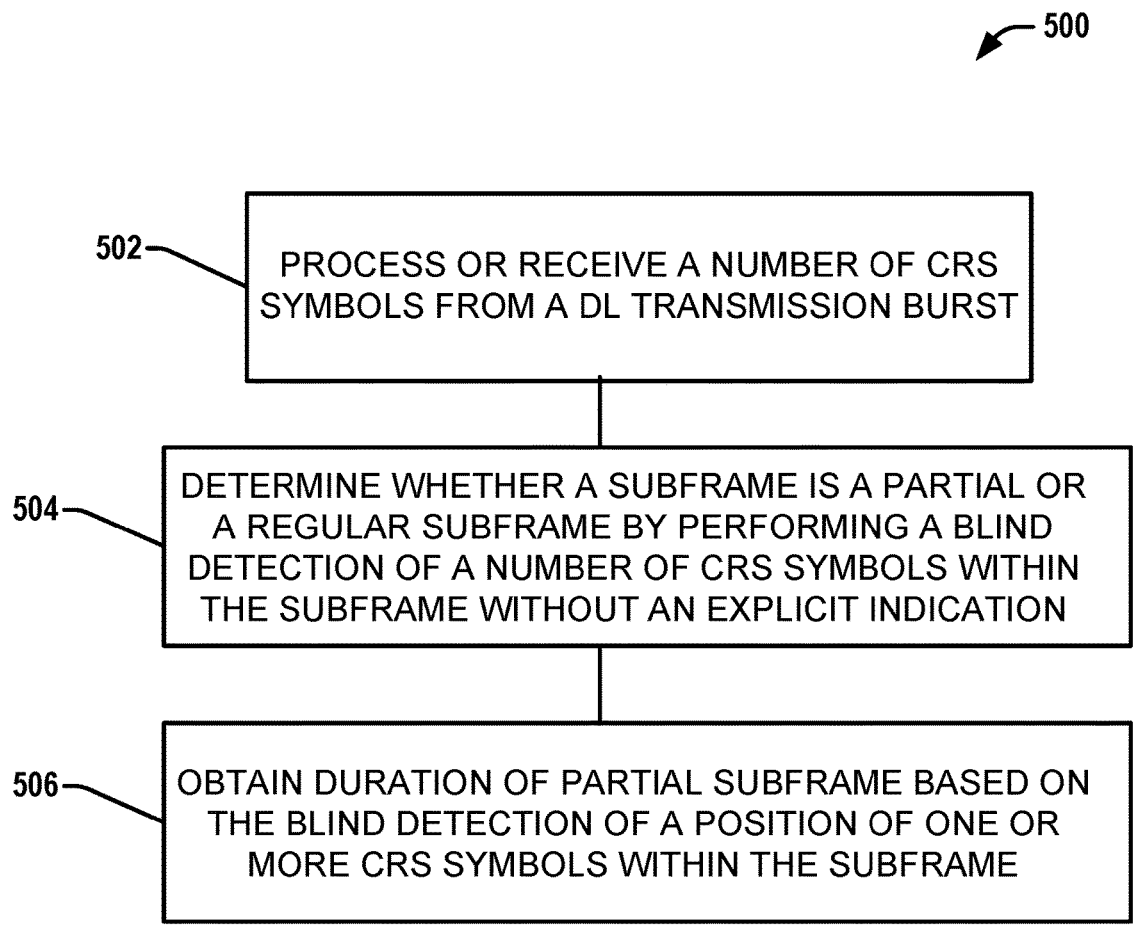
FIG. 5 is a flow diagram illustrating another method of enabling generation or processing of indication(s) of a partial/regular subframe within a downlink LAA transmission burst according to various aspects or embodiments described herein.

For example, briefly referring to the method 500 of FIG. 5, the signaling can trigger or provide the DL transmission burst by causing or relying upon the UE 200 receiving the DL transmission burst to process or receive a number of CRS symbols at 502. At 504, the UE 200 can then determine whether a subframe (e.g., an initial subframe) is partial or a regular subframe of a standard number/duration by generating a blind detection of the number of CRS symbols within the subframe without any explicit indication of the starting position or the number of CRs symbols of the initial starting subframe. At 506, the UE 200 can obtain the duration of the partial subframe, if determined as a partial subframe by performing a blind detection of the position of one or more CRS within the partial subframe.

For example, as noted above, if the possible starting positions are limited to {0,7}, for example, and this is known to the UE beforehand such as via RRC signalling form the eNB 100, then the detection of 2 CRS symbols present in the second slot or position out of the possible 4 CRS symbols for port 0/1 can imply that it is a partial subframe comprising 7 symbols. Alternatively or additionally, if the possible starting positions are limited to {0,4,7,11}, as indicated via RRC, for example, then the UE 200 could infer that the partial subframe starting position is symbol 11 in response to the UE 200 detecting CRS only at OFDM symbol 11, for example.

Alternatively or additionally, referring back to method 400 of FIG. 4, at 408 the eNB 100 can signal a starting position, a duration or both, of a partial subframe based on a DCI or a PCFICH transmission during a partial starting subframe or a subsequent regular subframe so that blind detection can be enabled to occur in the UE as a detection of the start of (E)PDCCH within a DL transmission burst. Blind detection of the PDCCH located at the start of a DL burst enables UE 200 to determine the presence and duration of the starting partial subframe. A UE, for example, can determine the duration of the subframe as an interval between the start of (E)PDCCH and the next PCell subframe boundary. This blind detection of (E)PDCCH can be possible if the UE can detect a (E)PDCCH, wherein CRC parity bits of (E)PDCCH are scrambled by a cell radio network temporary identifier (C-RNTI) of the UE 200. Otherwise, as it will be described later, a new LAA-RNTI can be defined to scramble the CRC bits, so that UEs (including non-scheduled UEs) can be able to detect the presence of (E)PDCCH.

In alternative embodiments, the acts 406 and 408 can be combined and the UE can combine the information obtained from act 406 and act 408 to determine the duration of the partial subframe without any explicit indication. In any one of the embodiments, UE could further set high false alarm probability for CRS detection and perform blind (E)PDCCH detection only if CRS is detected. This high false alarm probability for CRS detection can be trigger or set by the UE, signalling by the eNB or a higher level signalling, for example.

In another embodiment, blind detection of the number of CRS symbols within partial subframe can be done to enable detection of an ending partial subframe without any explicit indication or additional data from the eNB to the UE. Similar to the case of starting partial subframe, by performing blind detection of the number of CRS symbols within a subframe, the UE can differentiate between the partial subframe and regular subframe without any explicit indication from the eNB. In addition, UE may be able to obtain duration of the partial subframe based on the blind detection of the positions of CRS symbols within the partial subframe. Note that in the normal subframe, the positions of CRS symbols can be at OFDM symbols {0, 4, 7, 11} for ports 0/1 and symbols {1, 8} for ports 2/3. In one embodiment, if the possible ending positions are limited to {2, 5, 8}, then UE may be able to infer that the partial subframe ending position is 8, if UE only detects CRS at OFDM symbols 0, 4 and 7, for example.

Figure 6:
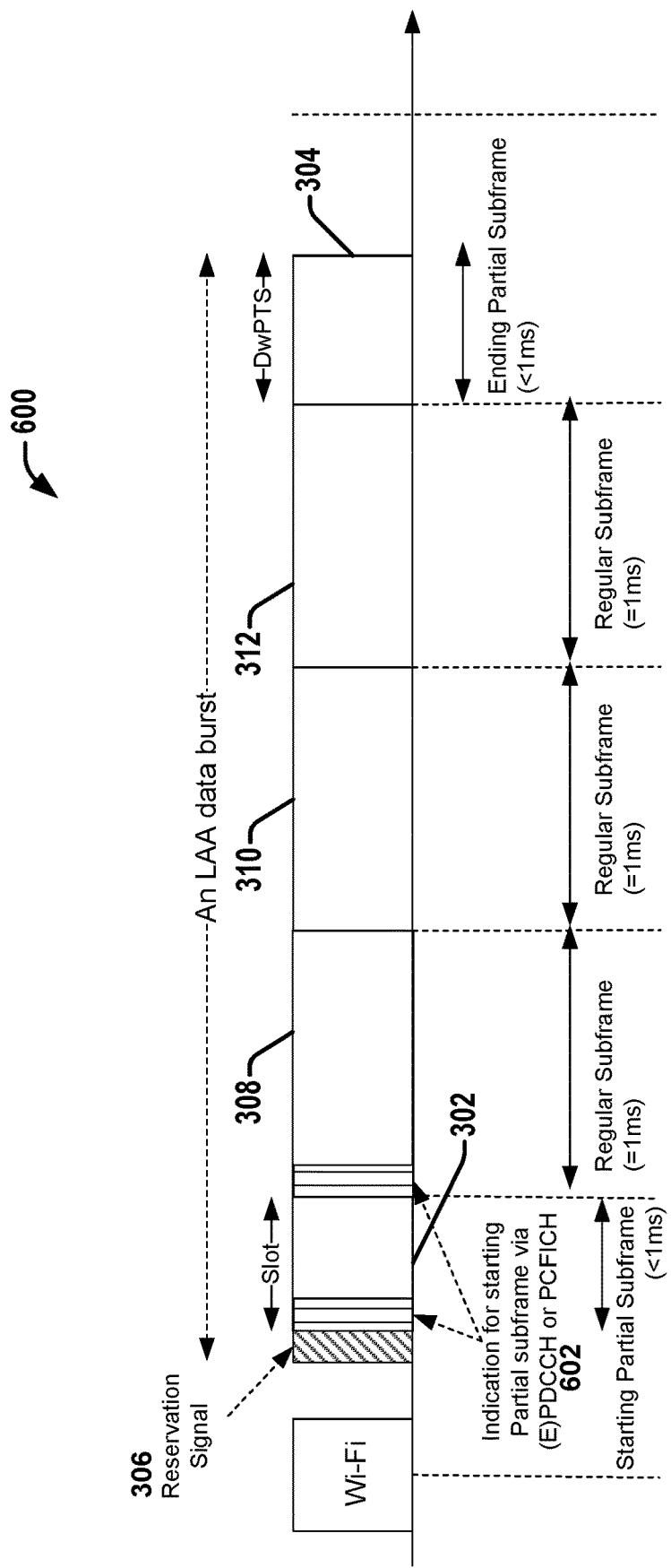
FIG. 6 is another diagram illustrating an example of a downlink LAA transmission with an explicit or implicit indication of partial/normal subframes in accordance with various aspects or embodiments described herein.

Referring to FIG. 6, illustrated is an example of an explicit indication for a starting partial subframe (e.g., 302, 304) of a DL transmission 600 in accordance with various aspects or embodiments. In these embodiments, explicit indication can be generated or processed via the network device 200 of properties comprising the starting position or the duration of the partial subframe as provided by the eNB to the UE as a configuration or configuration data. Some embodiments or aspects discussed below can be equally applicable to both starting and ending partial subframes.

In one example, DCI or PCFICH indication can be provided in the partial subframe 302 or 304, a next subframe (e.g., 308), a first regular subframe (e.g., 308) having a standard length/duration and number of symbols, or at some point during/within a DL transmission burst 600. In this embodiment, an explicit indication 602 of the starting position, the duration of the starting partial subframe, or both can be provided within the DCI or PCFICH of the partial subframe 302, 304 or the subframe following the partial subframe (e.g., the subsequent subframe 308 or other subsequent subframe 310-312). The slot therefore can comprise the subframe having symbols (e.g., OFDM symbols) and the indication or the subframe without the indication where the indication is in the subframe following the partial subframe 302.

PCFICH can provide, for example, 2 bits of information by fixing the PDCCH size, which can comprise a maximum or not, for example. Thus, PCFICH can indicate up to 4 starting positions. In one example of this illustration, the starting position for the first starting partial subframe 302 can be at symbol 7.

In another embodiment, a new or different CRS sequence can be provided within the partial subframe of a starting partial subframe 302 of the DL transmission burst via the eNB 100. For example, a modification of CRS sequence within the partial subframe can provide additional information regarding presence and duration of starting partial subframe 302, e.g. using a new or different CRS sequence that is dependent on the duration of the partial subframe. For example, these CRS sequences can indicate up to 8 different starting positions.

Figure 7:
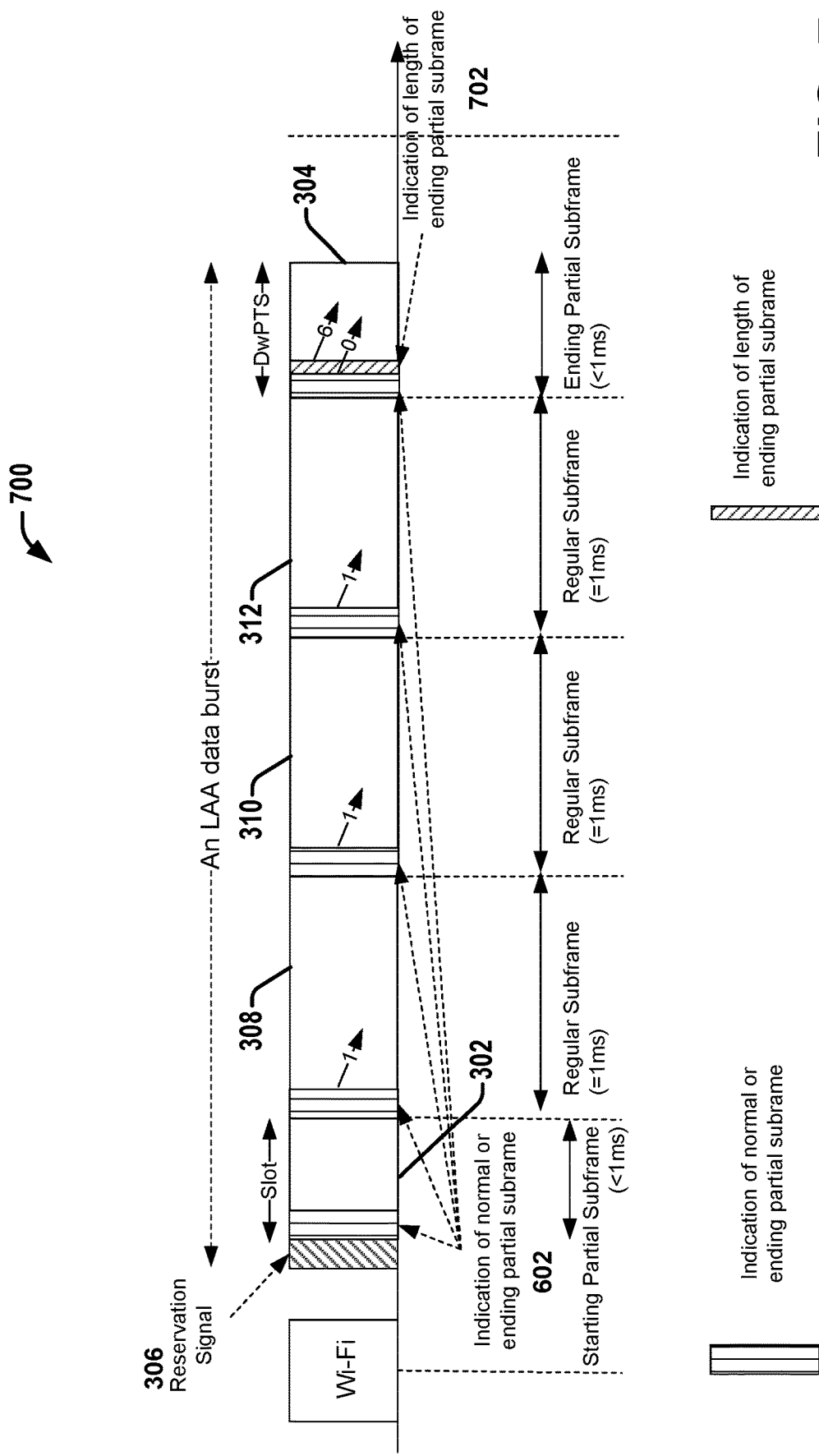
FIG. 7 is another diagram illustrating an example of a downlink LAA transmission with an explicit or implicit indication of partial/normal subframes in accordance with various aspects described herein.

Referring now to FIG. 7, illustrates an explicit indication by a network device of an ending partial subframe in a transmission burst 700 in accordance with various embodiments. An Explicit indication of various criteria such as the ending position, or the duration of the partial subframe can be provided via DCI within (E)PDCCH, PCFICH or via a newly generated CRS sequence within one of more of the subframes, such as at a beginning or boundary between subframes.

In one of the embodiments, the possible ending positions can be limited to {2, 5, 8, 9, 10, 11, 14} for normal CP, while for the extended CP possible ending positions can be limited to {2, 4, 7, 8, 9, 12}. For example, FIG. 7 illustrates that a starting position for a first partial subframe can be at symbol 7, while the length of the ending subframe can be at 6 symbols, in which the indication 702 can be configured utilizing DwPTS. The discussion herein and below, provides further various indication method acts for the ending partial subframe, which can also be applicable to the starting partial subframe in cases.

In one embodiment, within each subframe of the DL transmission burst 700, other than the first starting partial subframe 302, an indication (e.g., a one-bit or other number bit information) can be used to indicate whether the particular subframe is a normal subframe 308-312 or a partial subframe (e.g., 302, 304). For the ending partial subframe 304, one of the possible ending positions can be indicated as shown (e.g., by the arrow).

In another example, the last symbol position of the ending partial subframe with respect to the subframe boundary can be also used to indicate duration of the partial subframe. As shown, a normal subframe or partial subframe indication 602 can be done via transmitting a 1 bit in PDCCH whereas 0 can indicate a partial subframe or vice versa.

Figure 8:
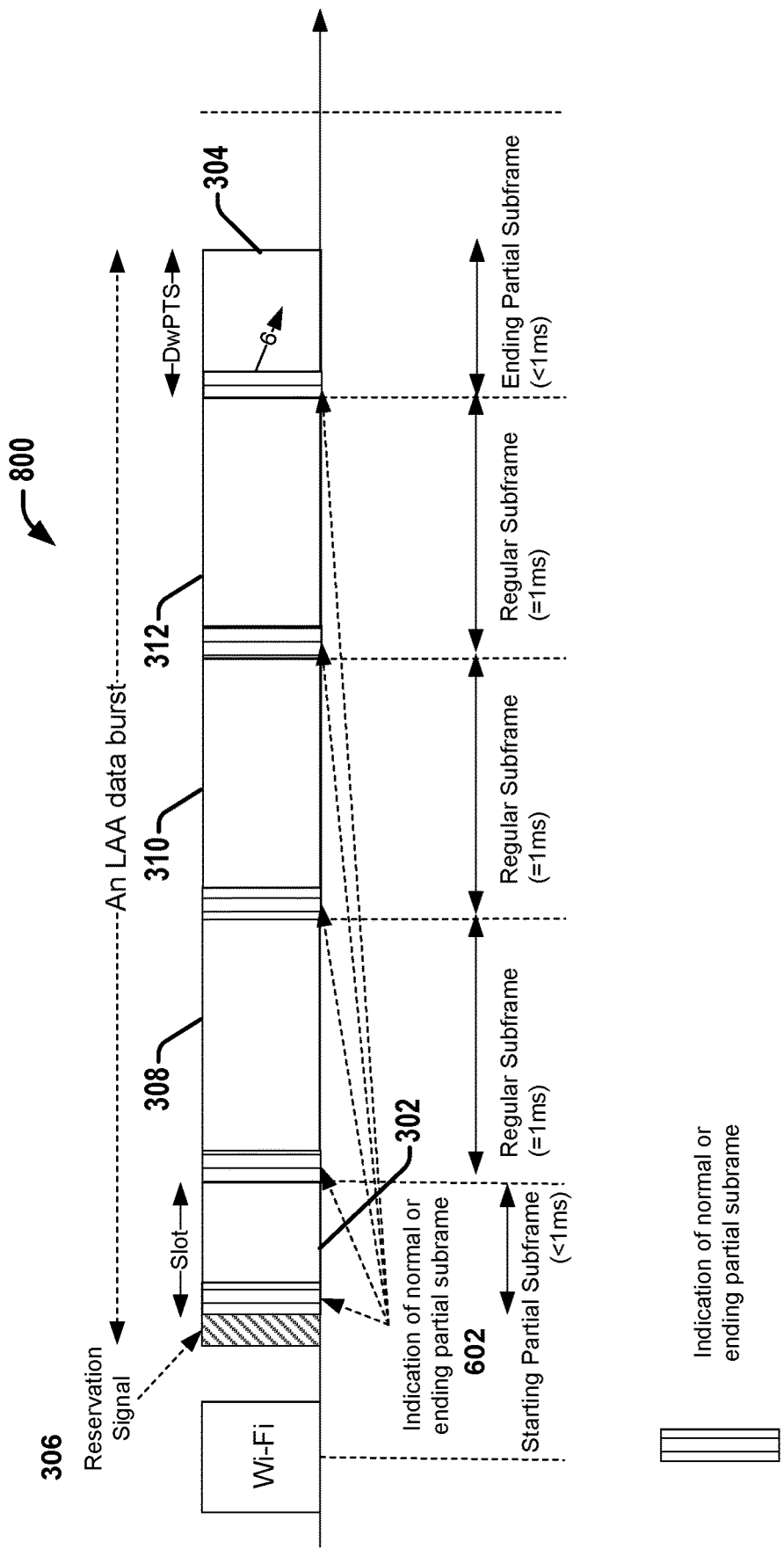
FIG. 8 is another diagram illustrating an example of a downlink LAA transmission with an explicit or implicit indication of partial/normal subframes in accordance with various aspects or embodiments described herein.

Referring to FIG. 8, illustrated is another example of an explicit indication for an ending partial subframe of an LAA DL transmission burst 800. In one embodiment, the ending position of an ending partial subframe 304 is indicated only within the ending subframe 304 within a DL burst. In one embodiment, the number of symbols within a partial subframe can be used to indicate the duration of the subframe. Additionally or alternatively, the symbol position of the last symbol of the ending partial subframe with respect to a given subframe boundary (i.e., the last regular length subframe boundary, or beginning partial subframe boundary) can be used to indicate a duration of the partial subframe. In one example of this illustration, the starting position for the ending partial subframe can be at symbol 7 (e.g., possible ending positions can be {0, 7} for a normal/regular CP), and at the same time the length of the ending subframe can be six symbols configured using DwPTS.

Figure 9:
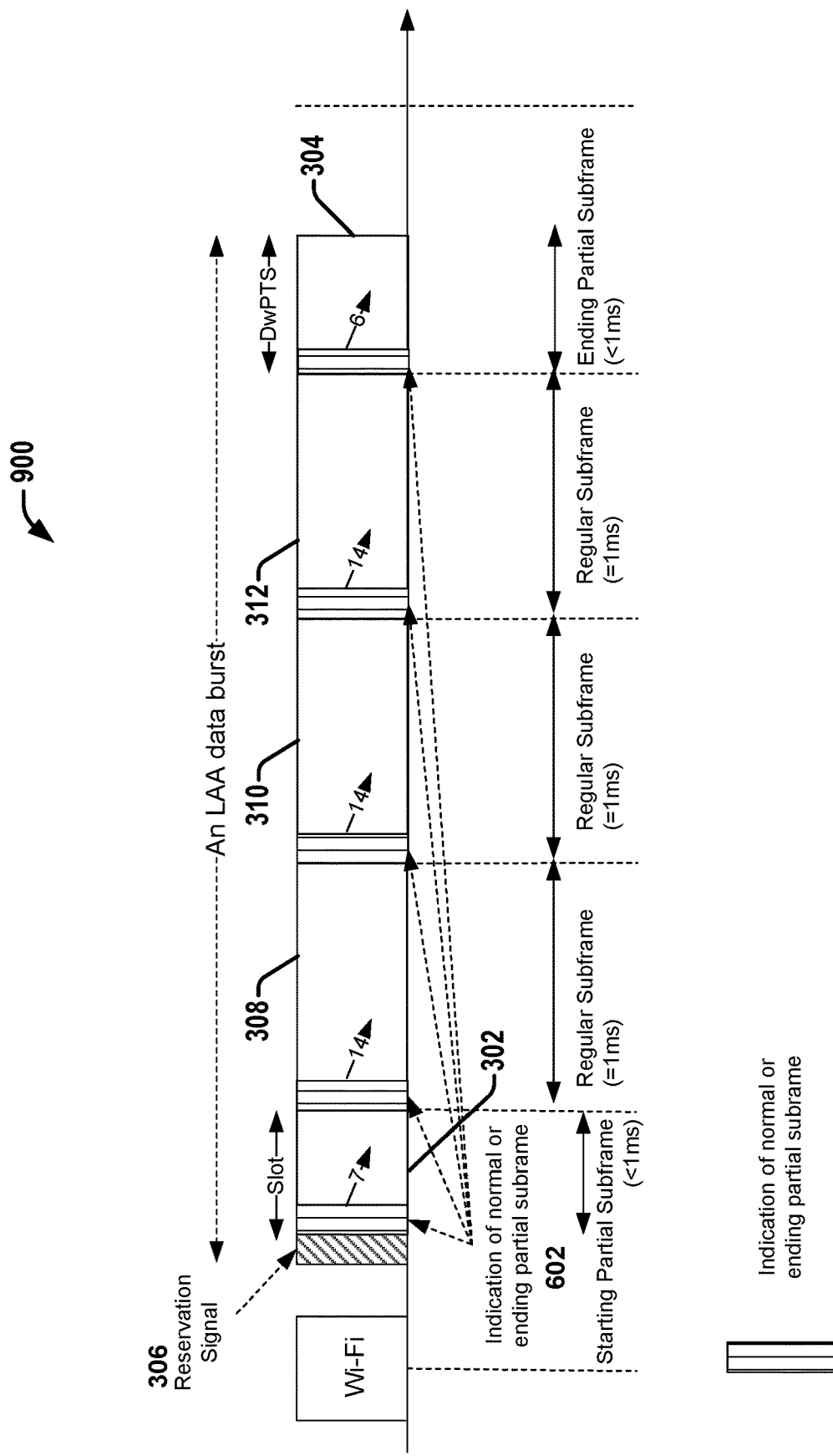
FIG. 9 is another diagram illustrating an example of a downlink LAA transmission with an embodiment of an explicit or implicit indication of partial/normal subframes in accordance with various aspects described herein.

Referring to FIG. 9, illustrated is another example of an explicit indication for an ending partial subframe 304 of an LAA DL transmission burst 900. The length of the subframe in number of OFDM symbols can be indicated in each subframe 302-312 within the DL burst 900, for example. In addition, if the last subframe is a normal subframe, the eNB 100 can indicate whether the considered normal subframe is an ending subframe or not. In one example, the eNB 100 could signal 0 as the ending position to indicate that the current normal subframe is the ending subframe of the DL burst. This additional information can indicate to UEs that the last subframe 304 within the DL burst 900 is a normal subframe. When the last subframe contains less than 14 symbols, the ending of the DL burst can be implicitly detected at the UE by a partial subframe detection. In one example of this illustration, the starting position for the ending partial subframe can be at symbol 7, while the length of the ending subframe can be six symbols configured using DwPTS.

In another embodiment, the number of symbols within each subframe can be used to indicate the duration of the subframe (e.g., 7, 14, 14, 14, and 6). In addition or alternatively, the position of the last symbol of the subframe with respect to a subframe boundary can be used to indicate the duration. In another embodiment, the first partial subframe (after the reservation signal 306) could not indicate such information as in FIG. 6 or 7, for example.

Figure 10:
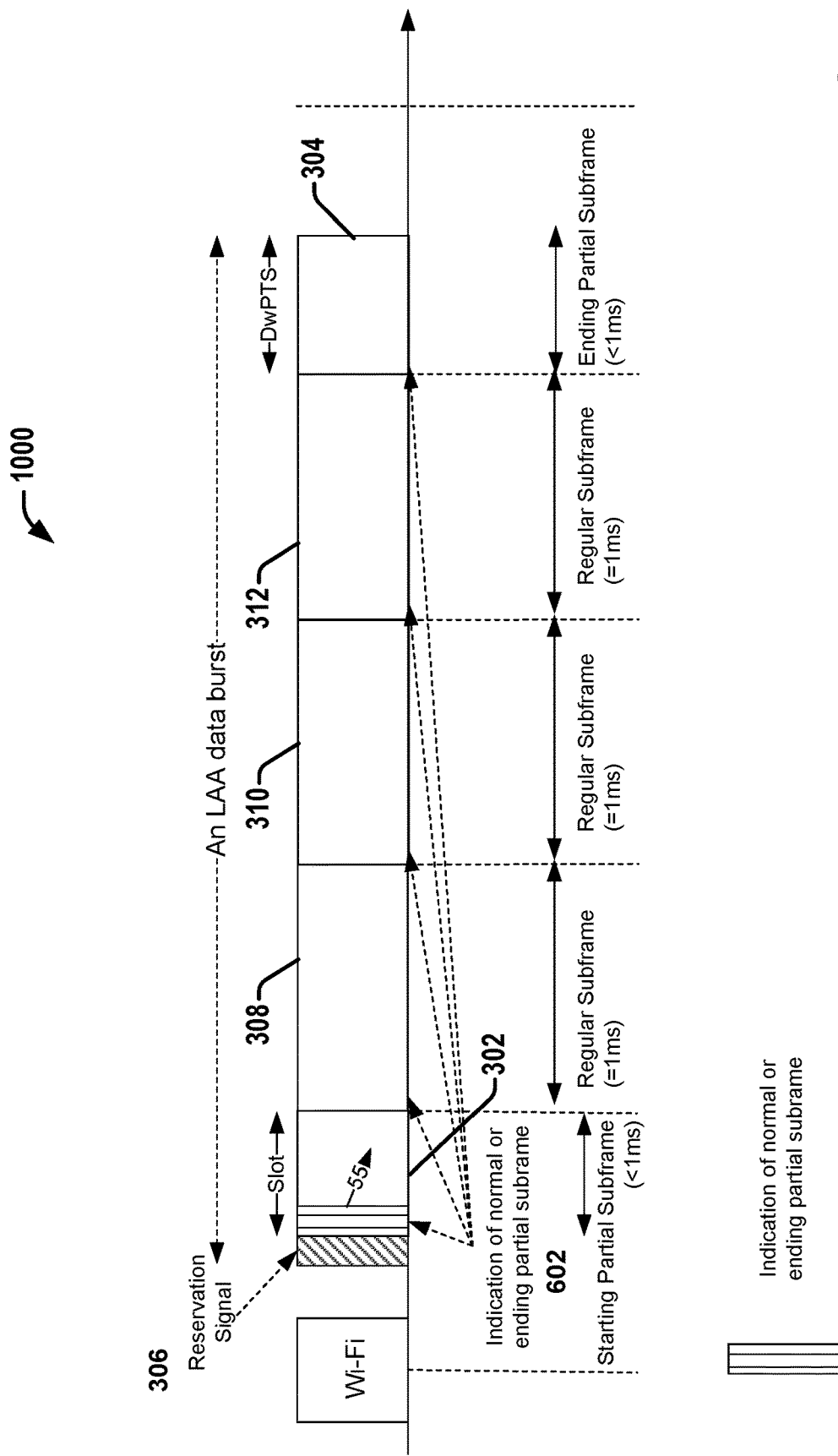
FIG. 10 is another diagram illustrating an example of a downlink LAA transmission with an explicit or implicit indication of partial/normal subframes in accordance with various aspects or embodiments described herein.

Referring to FIG. 10, illustrated is another example of an explicit indication for an ending partial subframe of an LAA DL transmission burst 1000. The number of OFDM symbols within the DL burst (LAA data burst) is indicated in the first subframe. A UE 200, for example, can then compute the ending position of the ending partial subframe based on the knowledge of the starting position and the length of DL burst. In this figure, the DL LAA transmission (data) burst can comprise about 3 normal subframes 308-312, the partial starting subframe 302, and the partial ending subframe 304 comprising 6 symbols via DwPTS configuration. In one example, the starting position for the ending partial subframe 304 can be at symbol 7, while the length of the ending subframe can be six symbols configured using DwPTS.

Figure 11:
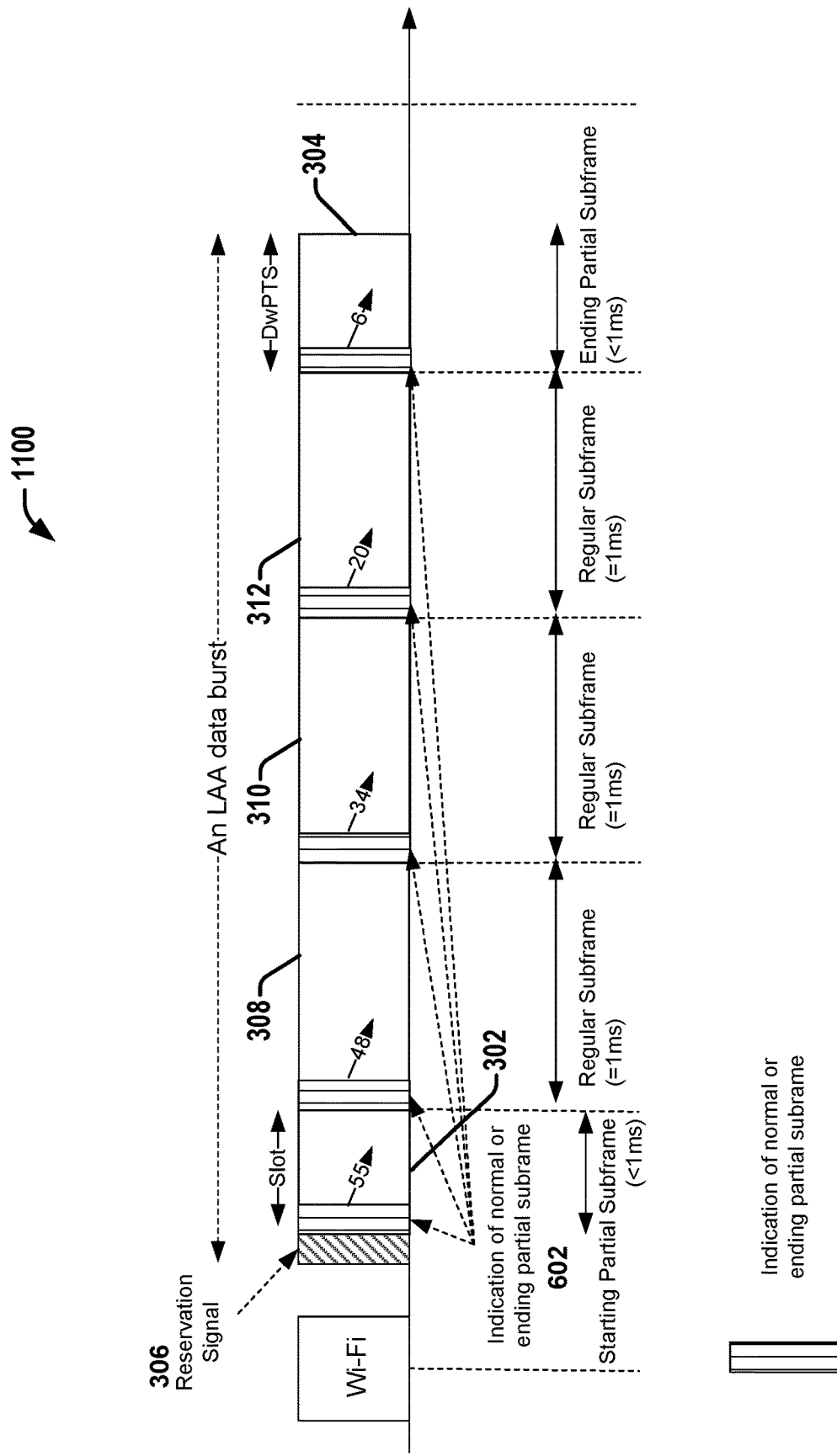
FIG. 11 is another diagram illustrating an example of a downlink LAA transmission an explicit or implicit indication of partial/normal subframes in accordance with various aspects or embodiments described herein.

Referring to FIG. 11, illustrated is another example of an explicit indication for an ending partial subframe of a LAA DL transmission burst 1100. In this embodiment, the total remaining symbols within a DL burst can be indicated in every subframe or a subset of subframes (one or more and less than all) within a DL burst. An eNB 100, for example, can indicate the total number of remaining symbols within the DL burst 1100 via RRC signaling or L1 indication to reduce the control overhead. In an example, the DL burst can comprise 3 normal subframes, the partial starting subframe, and the partial ending subframe including 6 symbols via DwPTS configuration. In another example of this illustration, the starting position for the ending partial subframe can be at symbol 7, while the length of the ending subframe can be six symbols configured using DwPTS. Other configurations of indications of different amounts can also be generated and processed from those discussed above as an example for discussion and illustration.

Figure 12:
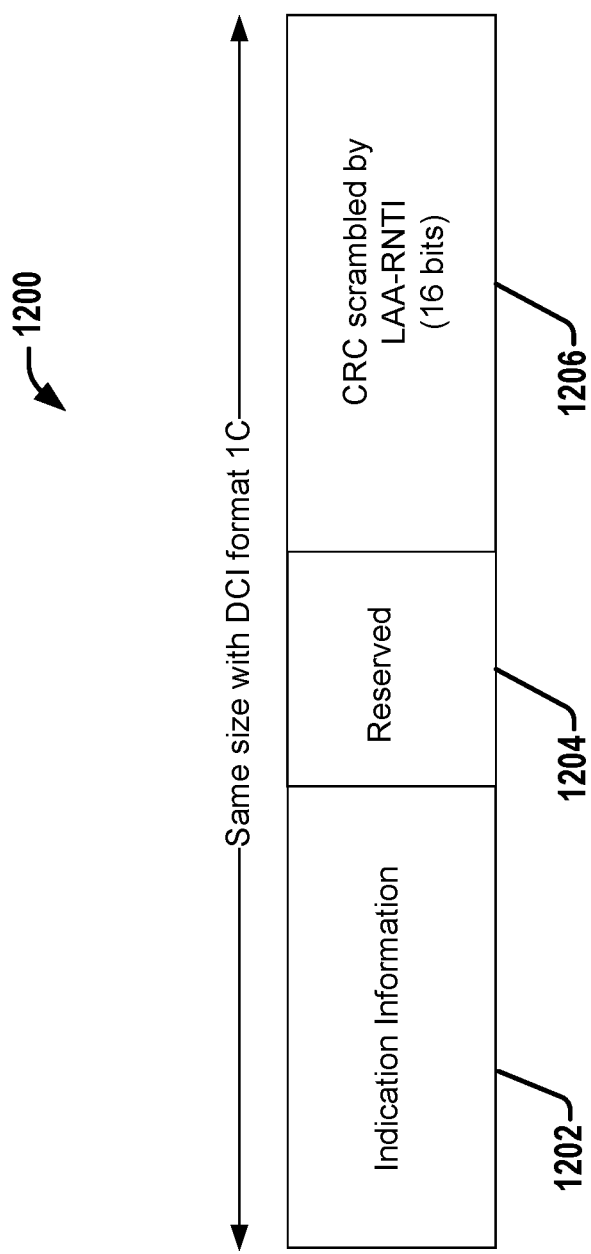
FIG. 12 is another diagram illustrating an example of a modified downlink control information (DCI) for signaling indication information related to a partial subframe in accordance with various aspects or embodiments described herein.
Figure 13:
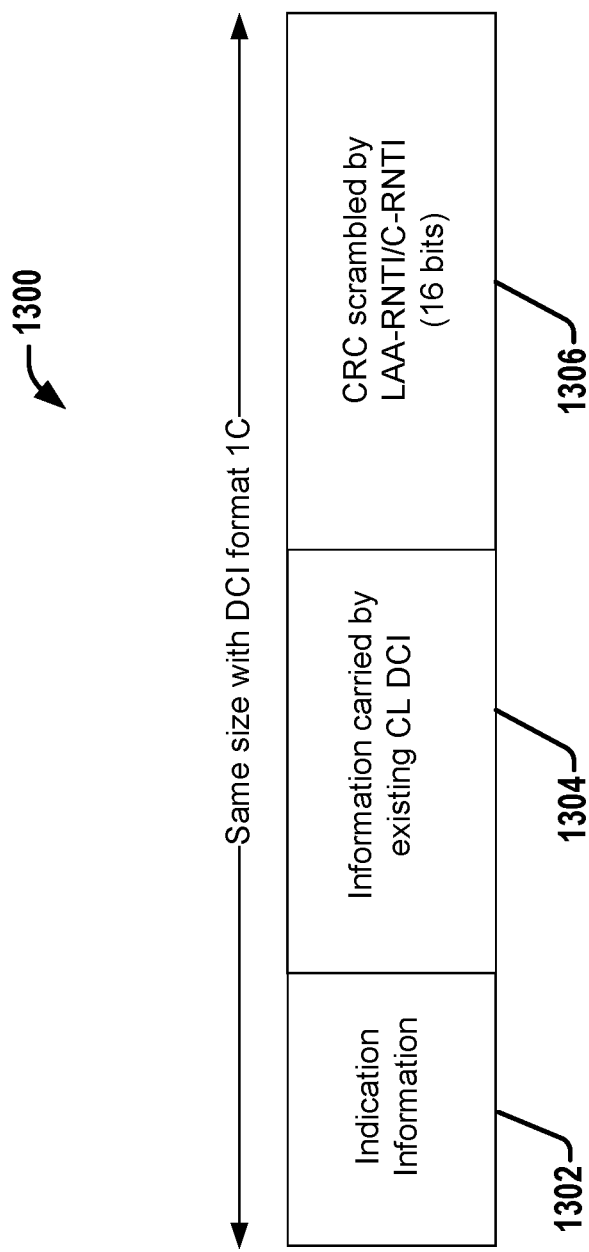
FIG. 13 is another diagram illustrating an example of a modified downlink control information (DCI) for signaling indication information related to a partial subframe in accordance with various aspects described herein.

The signalling and processing of an indication or indication information can be applicable to starting and ending subframes based on protocols or configuration details also presented in accordance with FIGS. 12 and 13. Referring to FIG. 12, illustrated is an example of a DCI based communication or protocol 1200 to indicate starting/ending partial subframes in a DL transmission in accordance with various embodiments described herein. A different or new DCI format or protocol 1200 can be generated while keeping its size to be the same with current standards as one of the existing DL DCIs to avoid increasing the blind decoding/detection attempts at the UEs.

In one embodiment, a new DCI format or one that is different from other DCI formats being transmitted can be the same size as a Rel-12 DCI format 1C or 1A, for example. The DCI 1200 gives an example, where the DCI format 1C is modified. The available payload in DCI format 1C (e.g., 12 bits without CRC padding for 5 MHz systems) can be reused to carry the indication information 1202 before the reserved data 1204.

The CRC parity bits 1206 can be scrambled by a newly defined Radio Network Temporary Identifier (RNTI) such as an LAA RNTI, to indicate the new function of the modified DCI for LAA. For example, the LAA RNTI can be fixed to one of the reserved RNTI values, i.e., FFF4-FFFC defined in 3GPP (see, e.g., TR 36.889). The LAA RNTI can be configured by the eNB 100 via RRC message, e.g., when configuring the LAA SCell.

The search space by which the UE searches for indication information for partial subframe parameters for the new DCI format can be a common search space (CSS) within the PCell, a CSS for an SCell: LTE design does not define a CSS within SCell, or be a newly defined UE-group space. The search space indicates the set of control channel elements (CCE) locations where the UE can find its PDCCHs. The coded DCI bits i.e. PDCCH payload, can be mapped to CCEs according to the PDCCH format. Each PDCCH carries one DCI, which can be identified by a radio network temporary ID, or RNTI. The RNTI can be implicitly encoded in the CRC attachment of the DCI, for example. There are two types of search space: the common search space and the UE-specific search space. A UE is required to monitor both common and UE-specific search space; note that there might be overlap between common and a UE-specific search spaces for a UE. As such a new CSS can also be defined for each SCell. For a UE-group search space, which is different and new from UE-specific search space, the UE-group search space can be modified by changing CRNTI used in the search space definition to LAA-RNTI.

The common search space can include the DCIs for system information (using the SI-RNTI), paging (P-RNTI), PRACH responses (RA-RNTI), or UL TPC commands (TPC-PUCCH/PUSCH-RNTI). The UE can monitor the common search space using aggregation level 4 and 8, for example. The UE-specific search space can carry DCIs for UE-specific allocations using the UE's assigned C-RNTI, semi-persistent scheduling (SPS C-RNTI), or initial allocation (temporary C-RNTI). The UE can monitor the UE-specific search space at all aggregation levels (e.g., 1, 2, 4, and 8). Specifically, for each serving cell on which PDCCH is monitored, the CCE searching index corresponding to PDCCH candidate m of the UE-group search space $S_k^{(L)}$ is given by $L\{(Y_k+m) \mod \lfloor N_{CCE,k}/L \rfloor + i\}$, where $m \in \{0, 1, \ldots, M^{(L)}-1\}$ is the index PDCCH candidate $M^{(L)}$ is the number of PDCCH candidates to monitor in the given search space, where $k=\lfloor n_s/2 \rfloor$ denotes the subframe index with $n_s$ being the slot number within a radio frame. $L \in \{1, 2, 4, 8\}$ is the aggregation level, and $N_{CCE,k}$ is the total number of CCEs in the control region of subframe k, $i \in \{0, 1, \ldots, L-1\}$, and $Y_k=(AY_{k-1}) \mod D$ with $Y_{-1}=n_{LAA-RNTI}$, A=39827 and D=65537.

In an embodiment, additional fields for carrying the indication information 1202 can be added to the existing DL DCI 1200. In one embodiment, as with the DCI 1200 of FIG. 12 below, the CRC parity bits 1206 can be scrambled by LAA-RNTI to indicate the new DCI information or format, and the search space of this new DCI can either be common or UE group search space. In another embodiment, C-RNTI can be reused to scramble the CRC parity bits 1206, and the search space can be a UE-specific search space.

Referring to FIG. 13, illustrated is another example of a DCI based communication/technique to indicate starting/ending partial subframes in a DL transmission 1200 in accordance with various embodiments. The DCI 1200 for signaling indication information 1202 of a partial (ending/starting) subframe can be modified from existing DCI by adding additional fields to carry the indication information 1202.

In one embodiment, additional fields for carrying the indication information 1202 can be added to the existing DL DCI 1204. In another embodiment, as with the DCI 1100 of FIG. 11, the CRC parity bits 1206 can be scrambled by LAA-RNTI to indicate the new DCI information or format, and the search space of this new DCI can either be common or UE group search space. In another embodiment, C-RNTI can be reused to scramble the CRC parity bits, and the search space can be UE-specific search space.

Additionally or alternatively, a CRS based method can be used for signalling the indication information 1302. The possible modifications in CRS generation can be made to carry more information rather than just a cell ID and a slot number as introduced. For example, the CRS sequence in OFDM symbol l of slot $n_s$ can defined by $$r_{l,n_s}(m) = \frac{1}{\sqrt{2}}(1 - 2c(2m)) + j\frac{1}{\sqrt{2}}(1 - 2c(2m+1)),$$

wherein $m \in \{0, 1, \ldots, 2N_{RB}^{max,DL}-1\}$, and $c(n)$ is a pseudo-random sequence defined by a length-31 Gold sequence. At the start of each OFDM symbol, $c(n)$ is initialized by $c_{init}=2^{10}(7(n_s+1)+l+1)(2N_{ID}^{cell}+1)+2N_{ID}^{cell}+N_{CP}$, where $N_{ID}^{cell}$ is the cell ID and $N_{CP}$ denotes the type of CP with $N_{CP}=1$ for normal CP and $N_{CP}=0$ for extended CP.

The partial subframe related information can be inserted in the CRS by modifying the initial value of the pseudo-random sequence generator for CRS generation as follows:

$c_{init}=2^{10}(7(n_s+1)+l+1+\Sigma_{0\leq i \leq 7}i^*140x_i)(2N_{ID}^{cell}+1)+2N_{ID}^{cell}+N_{CP},$ where $x_i$ is a 1-bit information that can be inserted in the CRS.

In one embodiment, $x_i$, i>1 indicates one of the DwPTS configurations within 6 possible ending positions, while $x_i$, i=0, indicates a regular subframe for the ending subframe. In other embodiments, $x_i$, i>1 indicates one of the possible starting partial subframe configurations, while $x_i$, i=1 indicates a regular subframe for the starting subframe.

In another embodiment, a PCFICH based method can be used for signalling indication information. By limiting the number of potential PDCCH sizes, available bits in PCFICH can be used to carry the indication information. As one of the embodiment, if the PDCCH size can be fixed or configured semi-statically via higher layer signaling, PCFICH can be used to indicate 2 bits of information. In some embodiments, the 2 bits can be used to indicate the duration of partial subframe.

Figure 14:
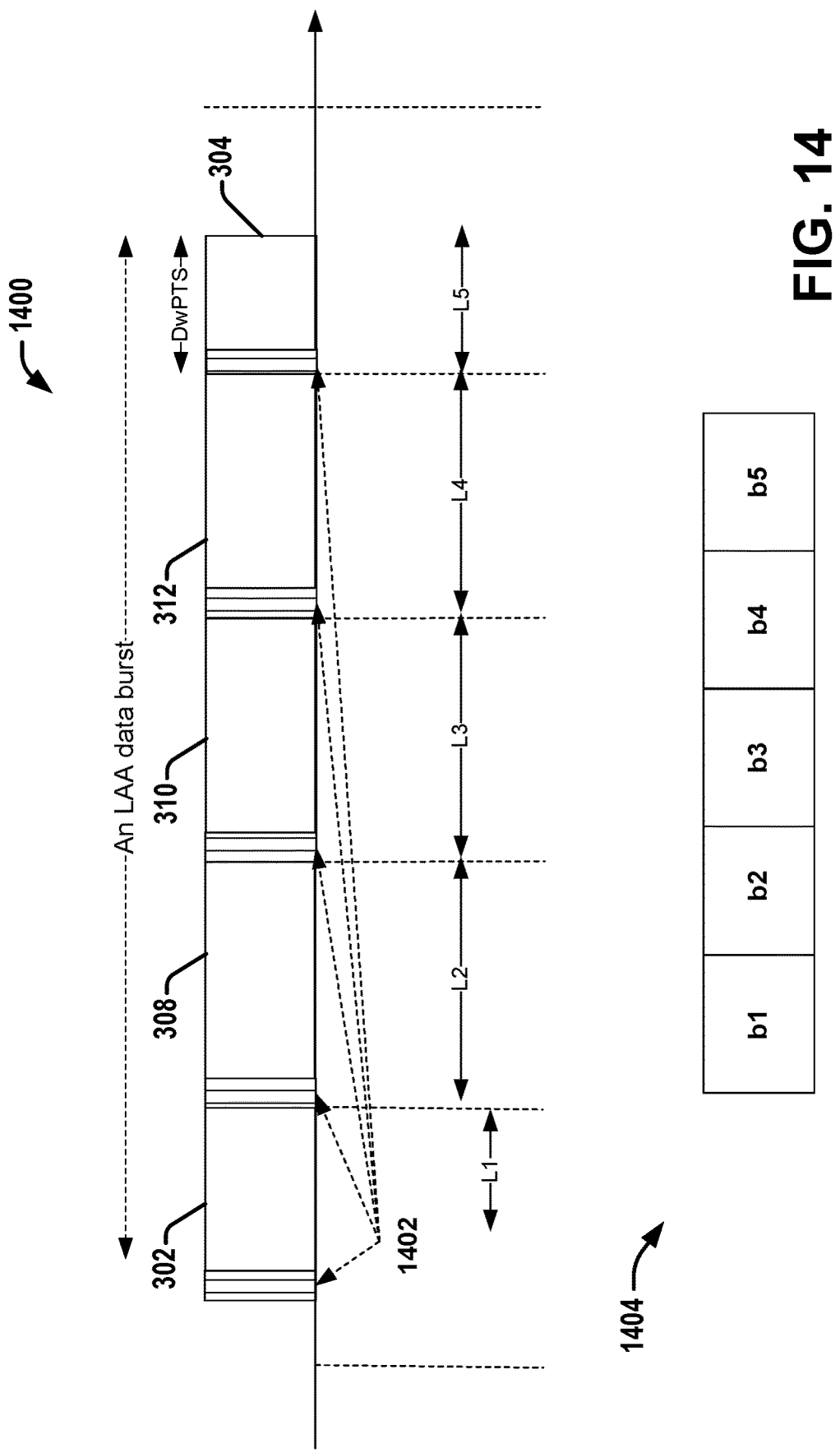
FIG. 14 is another diagram illustrating an example of a downlink LAA transmission with an explicit or implicit indication of partial/normal subframes in accordance with various aspects or embodiments described herein.

Referring to FIG. 14, illustrated is another example of communication of a partial frame indication with an LAA DL transmission burst in accordance with various aspects or embodiments described herein. Here, the starting of the transmission for DL burst 1400 can be aligned with PCell subframe boundary as an aligned transmission over PCell and SCell. On the other hand, an LBT can finish any time in between PCell subframe boundaries. If such PCell subframe boundary alignment restriction is enforced, the interval from the end of the successful LBT to the start of the following PCell subframe boundary would be wasted, as no data is transmitted by the eNB during this interval. To improve the resource utilization efficiency with this regard, the notion of partial subframes has been introduced in the LAA system, whose TTI is less than 1 ms. As discussed, the first subframe of a DL transmission burst can be partial as LBT can finish any time in between the subframe boundaries. The last subframe of a DL transmission burst can also be partial if the burst needs to be shortened according to the maximum channel occupancy time (MOOT) limit, for example.

In one embodiment, the eNB 100 could generate a DL transmission burst 1400 with an indication 1402 of the length of a current subframe (e.g., 302) and the following subframe (e.g., 308), which could also include the ending subframe in each indication as well. By doing so, the receiver or UE 200, for example, can have an information about the length of the coming subframe along the DL transmission burst being processed at any given time.

For example, the PDCCH of a current subframe 302 can indicate the length of the current subframe (e.g., L1) and the length (e.g., L2) of the following subframe 308, denoted by L2. The first (from left to right along the transmission 1400) indication 1402 can indicate L1 and L2, the second indication 1402 of subframe 308 can indicate L2 and L3, the third indication 1402 of subframe 310 can indicate L3 and L4, the fourth indication 1402 of subframe 312 can indicate L4 and L5, and the last subframe indicate itself or otherwise. Any one or all indications 1402 can also include the ending subframe of the current transmission burst. The ending subframe can be, for instance, the current subframe or the next following subframe.

In LAA systems, for example, the DwPTS structure can be used for the ending partial subframe. The existing Frame Type 2, time division duplex (TDD), defines the downlink portion of the special subframe consisting of {3, 6, 9, 10, 11, 12} OFDM symbols. Further support could come for supporting partial subframes consisting of 3 or 13 OFDM symbols. In another embodiment, 3 bits could be utilized to indicate {3, 6, 9, 10, 11, 2, 13, N}, where N denotes the normal subframe.

Additional details and embodiments are discussed below for the signaling indication information, in which should be also understood as an illustrative purpose and examples not to be regarded in a completely restrictive sense. The bits 1404 (e.g., b1-b4), for example, can be configured for the indication information. The bit b1 can be used whether the current subframe is the ending subframe or not. The following bits, b2, b3, and b4 can be used to indicate the length of the partial subframe.

In one embodiment, a current subframe in an indication 1402 can be a partial subframe and also the ending subframe 304. In this case, the indication 1402 (e.g., as the fifth indication 1402 from left to right) would be the bit b1 and could be set to 1, indicating that the current subframe is the ending subframe. The following bits, b2, b3, and b4, can indicate the length of the current partial subframe, L5, where L5 is less than 14 OFDM symbols and one of allowed partial subframe lengths by standard.

Alternatively or additionally, a current subframe in an indication 1402 can be a normal subframe of regular length (e.g., 14) and also be the ending subframe 304. In this case, the bit b1 of the indication 1402 can be set to 1, indicating that the current subframe is the ending subframe 304. The following bits, b2, b3, and b4 can further indicate the length of the current partial subframe (e.g., L5), where L5 is 14 OFDM symbols.

In another embodiment, a normal subframe (e.g., 312) could be followed by a partial subframe 304 within the DL transmission 1400. In this case, the bit b1 is set to 0 indicating that the current subframe is not the ending subframe 304. The following bits, b2, b3, and b4 can then be interpreted or processed by the UE as the length of the following subframe, L5, which can be less than 14 OFDM symbols and one of the allowed partial subframe lengths. Since the current subframe 312 is not the ending subframe 304, the current subframe length, L4, is automatically interpreted as a normal subframe consisting of 14 OFDM symbols. Since the following subframe is a partial subframe, it is automatically interpreted that the following subframe is the ending subframe 304 of the current DL burst 1400.

In another embodiment, a normal subframe could be followed by a normal subframe such as with the first or second regular subframe 308 or 310, for example. In this case, the bit b1 can be set to 0 indicating that the current subframe is not the ending subframe 304. The following bits, b2, b3, and b4 of the indication can then interpreted as the length of the following subframe, L3 or L4, which can be the regular 14 OFDM symbols. Because the current subframe is not the ending subframe, the current subframe length, L2 or L3, can be automatically interpreted as a normal subframe consisting of 14 OFDM symbols.

In an example, consider when there are six options for allowed partial subframe lengths, in the case where partial subframe lengths are standardized, i.e., either 3 or 13 OFDM symbol options can be eliminated by the eNB or UE. Then, with 3 bits, we can still indicate two or more combinations. For instance, the three bits could indicate {X, 6, 9, 10, 11, 12, N1, N2}, where X is either 3 or 13 OFDM symbol partial subframe. N1 and N2 can indicate both normal subframes, however, N1 indicates that the following subframe is the ending subframe and N2 indicates the following subframe is not the ending subframe. Therefore, with total of 4 bits, the indication 1402 can still indicate whether the following subframe is the ending subframe or not. Considering when the number of allowed partial subframe lengths is 7, i.e., {3, 6, 9, 10, 11, 12, 13}, and the three bits are used to indicate {3, 6, 9, 10, 11, 12, 13, N}. Then, there could be a lack of information indicating whether the following subframe is the ending subframe or not. In this case, an additional bit, denote by b5, could be used to indicate whether the following subframe is the ending subframe 304 or not.

In an additional embodiment, a partial subframe 302 could be followed by a normal/partial subframe. This could be a special case in which a DL transmission burst 1400 starts with a partial subframe and is followed by a normal/partial subframe. If the length of the starting partial subframe 302 can be blindly detected, then the above signaling mechanisms described for FIG. 14 can be reused here. However, in the case in which an explicit indication of the length of the starting partial subframe is desired, then either 6-bit or 8-bit signaling can be considered. If the number of allowed partial subframe length options is six, then similar to the above embodiment, the three bits can indicate {X, 6, 9, 10, 11, 12, N1, N2}. Thus, with 6-bit information, 3 bits can be used to indicate the length of the current subframe and the remaining 3 bits can be used to indicate the length of the following subframe. If the number of allowed partial subframe lengths is 7, i.e., {3, 6, 9, 10, 11, 12, 13}, then an 8-bit indication can be used. With 4 bits, the length of the first subframe can be indicated along with whether it is the ending or not. The remaining four bits can be used to indicate the following subframe length along with whether it is ending or not.

Figure 15:
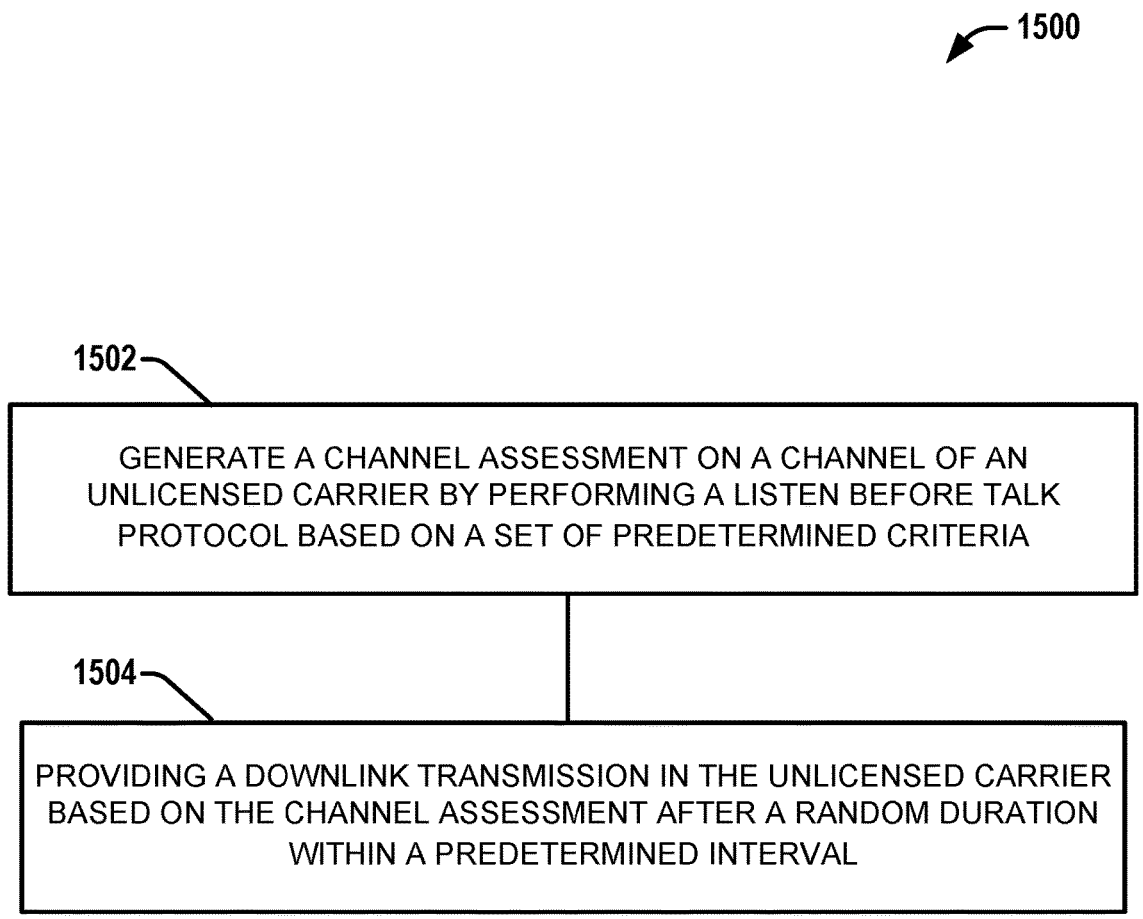
FIG. 15 is a flow diagram illustrating another method of processing or generating an indication of subframes within a DL transmission via LAA in unlicensed spectrum according to various aspects or embodiments described herein in a LAA wireless system.

Referring now to FIG. 15, illustrated is a method 1500 to be executed by a processor of one or more network devices (e.g., 100 or 200) such as an eNB or UE via executable instructions in a memory or a computer-readable storage medium, for example. The method initiates at 1502 with generating, via the processor, a channel assessment on a channel of an unlicensed carrier by performing a listen before talk protocol based on a set of predetermined criteria, such as a signal strength, a power strength of a channel to a secondary cell network device, or other property for LBT to determine an idle or busy signal.

At 1504 the method comprises providing a downlink transmission in the unlicensed carrier based on the channel assessment after a random duration within a predetermined interval. The random duration can be any time between an LBT and the start of a regular/partial subframe, for example.

In one embodiment, the method can include providing downlink control information indicating a first length of a current subframe and a second length of a subsequent subframe in a plurality of subframes of the downlink transmission and enable a determination that identifies between a regular subframe and a partial subframe of the plurality of subframes, wherein the predetermined interval comprises a time between an ending of the LBT protocol and an aligned starting position for regular subframes of downlink transmissions. The DCI can be within a PDCCH of the downlink transmission, which comprise a plurality of bits with at least one of the plurality of bits being configured to indicate whether the current subframe comprises a beginning subframe or an ending subframe while remaining bits indicate a partial subframe length of the partial subframe of the downlink transmission. In response to the current subframe comprising a non-beginning subframe or a non-ending subframe, the remaining bits of the plurality of bits could indicate the second length of the subsequent subframe.

In addition, the method 1500 can include generating an indication of a starting position or an ending position of the downlink transmission as only within a starting partial subframe or an ending partial subframe, respectively. The indication can also be generated with a number of symbols of a length of a corresponding subframe within a plurality of subframes of the downlink transmission and a subsequent subframe of the plurality of subframes, wherein a total number of OFDM symbols within the downlink transmission is indicated in a first subframe only, or wherein the total number of OFDM symbols remaining within the downlink transmission is indicated in every subframe or in a subset of the plurality of subframes within the downlink transmission.

In one example, the indication can be inserted in a CRS by modifying an initial value of a pseudo-random sequence generator for generation of the CRS. A DCI can be modified, for example, by reusing existing downlink DCI and scrambling cyclic redundancy check based on an licensed assisted access cell-radio network temporary identifiers, wherein a search space comprises a common or UE-group search space.

Examples herein can include subject matter such as a method, means for performing acts or blocks of the method, at least one machine-readable medium including executable instructions that, when performed by a machine (e.g., a processor with memory, an application-specific integrated circuit (ASIC), a field programmable gate array (FPGA), or the like) cause the machine to perform acts of the method or of an apparatus or system for concurrent communication using multiple communication technologies according to embodiments and examples described.

It is to be understood that aspects described herein can be implemented by hardware, software, firmware, or any combination thereof. When implemented in software, functions can be stored on or transmitted over as one or more instructions or code on a computer-readable medium. Computer-readable media includes both computer storage media and communication media including any medium that facilitates transfer of a computer program from one place to another. A storage media or a computer readable storage device can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or other tangible and/or non-transitory medium, that can be used to carry or store desired information or executable instructions. Also, any connection is properly termed a computer-readable medium. For example, if software is transmitted from a website, server, or other remote source using a coaxial cable, fiber optic cable, twisted pair, digital subscriber line (DSL), or wireless technologies such as infrared, radio, and microwave, then coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Various illustrative logics, logical blocks, modules, and circuits described in connection with aspects disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor can be a microprocessor, but, in the alternative, processor can be any conventional processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration. Additionally, at least one processor can comprise one or more modules operable to perform one or more of the s and/or actions described herein.

For a software implementation, techniques described herein can be implemented with modules (e.g., procedures, functions, and so on) that perform functions described herein. Software codes can be stored in memory units and executed by processors. Memory unit can be implemented within processor or external to processor, in which case memory unit can be communicatively coupled to processor through various means as is known in the art. Further, at least one processor can include one or more modules operable to perform functions described herein.

Techniques described herein can be used for various wireless communication systems such as CDMA, TDMA, FDMA, OFDMA, SC-FDMA and other systems. The terms "system" and "network" are often used interchangeably. A CDMA system can implement a radio technology such as Universal Terrestrial Radio Access (UTRA), CDMA1800, etc. UTRA includes Wideband-CDMA (W-CDMA) and other variants of CDMA. Further, CDMA1800 covers IS-1800, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.18, Flash-OFDM☐, etc. UTRA and E-UTRA are part of Universal Mobile Telecommunication System (UMTS). 3GPP Long Term Evolution (LTE) is a release of UMTS that uses E-UTRA, which employs OFDMA on downlink and SC-FDMA on uplink. UTRA, E-UTRA, UMTS, LTE and GSM are described in documents from an organization named "3rd Generation Partnership Project" (3GPP). Additionally, CDMA1800 and UMB are described in documents from an organization named "3rd Generation Partnership Project 2" (3GPP2). Further, such wireless communication systems can additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Single carrier frequency division multiple access (SC-FDMA), which utilizes single carrier modulation and frequency domain equalization is a technique that can be utilized with the disclosed aspects. SC-FDMA has similar performance and essentially a similar overall complexity as those of OFDMA system. SC-FDMA signal has lower peak-to-average power ratio (PAPR) because of its inherent single carrier structure. SC-FDMA can be utilized in uplink communications where lower PAPR can benefit a mobile terminal in terms of transmit power efficiency.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product can include a computer readable medium having one or more instructions or codes operable to cause a computer to perform functions described herein.

Communications media embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

Further, the actions of a method or algorithm described in connection with aspects disclosed herein can be embodied directly in hardware, in a software module executed by a processor, or a combination thereof. A software module can reside in RAM memory, flash memory, ROM memory, EPROM memory, EEPROM memory, registers, a hard disk, a removable disk, a CD-ROM, or any other form of storage medium known in the art. An exemplary storage medium can be coupled to processor, such that processor can read information from, and write information to, storage medium. In the alternative, storage medium can be integral to processor. Further, in some aspects, processor and storage medium can reside in an ASIC. Additionally, ASIC can reside in a user terminal. In the alternative, processor and storage medium can reside as discrete components in a user terminal. Additionally, in some aspects, the s and/or actions of a method or algorithm can reside as one or any combination or set of codes and/or instructions on a machine-readable medium and/or computer readable medium, which can be incorporated into a computer program product.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

Example 1 is an apparatus configured to be employed within an evolved NodeB (eNB), comprising: a radio frequency ("RF") circuitry component configured to process or generate communication signals on an unlicensed spectrum; and a baseband component, coupled to the RF circuitry component, configured to generate a clear channel assessment of one or more secondary cell network devices by performing a listen before talk protocol ("LBT") to detect whether a channel of the one or more second cell network devices is busy or idle, and in response to the detecting the channel of the one or more second cell network devices is idle, generate a downlink transmission via the channel in the unlicensed spectrum after a random duration that is specified within a predetermined interval of the downlink transmission.

Example 2 includes the subject matter of Example 1, wherein the downlink transmission comprises at least one of a partial subframe at a beginning of the downlink transmission or another partial subframe at an end of the downlink transmission, and wherein the at least one of the partial subframe or the another partial subframe comprises a plurality of orthogonal frequency division multiplexing symbols ("OFDM") less than or equal to a regular LTE subframe, and wherein the predetermined interval comprises a time between an ending of the LBT protocol and an aligned starting position for regular subframes of downlink transmissions.

Example 3 includes the subject matter of any of Examples 1-2, including or omitting any elements, wherein the baseband component is further configured to enable a user equipment ("UE") to independently differentiate between a regular subframe and at least one of the starting partial subframe or the ending partial subframe, and differentiate between different starting partial subframes or different ending partial subframes that differ in one or more parameters from one another based on a blind detection of a total number OFDM symbols and a plurality of positions of OFDM symbols in a cell-specific reference signal ("CRS"), wherein the parameters include at least one of a starting position of a starting partial subframe, an ending position of an ending partial subframe, or a duration of the starting partial subframe or the ending partial subframe.

Example 4 includes the subject matter of any of Examples 1-3, including or omitting any elements, wherein the baseband component is further configured to indicate at least one of a starting position or a duration of a starting partial subframe based on a blind detection of an enhanced physical downlink control channel ("(E)PDCCH") within the starting partial subframe, or based on a downlink control information ("DCI") or physical control format indicator channel ("PCFICH") transmitted within the starting partial subframe or a subsequent regular subframe.

Example 5 includes the subject matter of any of Examples 1-4, including or omitting any elements, wherein the baseband component is further configured to indicate at least one of a starting position, an ending position, a duration of a starting partial subframe, or another duration of an ending partial subframe, and a different duration of a subsequent subframe based on a CRS sequence transmitted within the starting partial subframe or the ending partial subframe.

Example 6 includes the subject matter of any of Examples 1-5, including or omitting any elements, wherein the baseband component is further configured to indicate at least one of an ending position or a duration of an ending partial subframe based on a blind detection of a number of symbols and a plurality of positions of OFDM symbols with a CRS sequence to enable a UE to independently differentiate between a regular subframe and the ending partial subframe, or based on a DCI or a PCFICH transmission within the ending partial subframe or within the regular subframe of the downlink transmission, and in response to the CRS not being modified to indicate a partial subframe presence, the UE considers the subframe as a regular subframe.

Example 7 includes the subject matter of any of Examples 1-6, including or omitting any elements, wherein the baseband component is further configured to generate a one-bit information in every subframe or a subset of subframes of a plurality of subframes within the downlink transmission to indicate whether the subframe is a normal subframe or a partial subframe, and, in response to the subframe comprising the partial subframe as an ending partial subframe, indicate at least one of possible ending positions, and, in response to the on-bit information not being indicated, a UE considers the subframe as the normal subframe.

Example 8 includes the subject matter of any of Examples 1-7, including or omitting any elements, wherein the baseband component is further configured to generate an indication of an ending position of the downlink transmission within an ending partial subframe, wherein the baseband component is further configured to generate another indication in a number of OFDM symbols of a length of a current subframe within a plurality of subframes of the downlink transmission and a subsequent subframe of the plurality of subframes, wherein a total number of OFDM symbols within the downlink transmission is indicated in a first subframe, or wherein a total number of remaining OFDM symbols within the downlink transmission is indicated in every subframe or a subset of the plurality of subframes within the downlink transmission.

Example 9 includes the subject matter of any of Examples 1-8, including or omitting any elements, wherein the baseband component is further configured to indicate at least one of an ending position or a duration of a partial subframe of the downlink transmission based on a DCI, and scrambling cyclic redundancy check ("CRC") based on an licensed assisted access cell-radio network temporary identifiers ("LAA-RNTI"), wherein a search space comprises a common search space or a UE-group search space, and in response to the DCI indicating that the partial subframe is not present, a UE considers a subframe of the downlink transmission as a regular subframe.

Example 10 includes the subject matter of any of Examples 1-9, including or omitting any elements, wherein the baseband component is further configured to provide control information indicating a first length of a current subframe and a second length of a subsequent subframe in the downlink transmission and enable a determination between a regular subframe and a partial subframe among a plurality of subframes of the downlink transmission.

Example 11 includes the subject matter of any of Examples 1-10, including or omitting any elements, wherein the control information is located within a PDCCH of the downlink transmission, comprises a plurality of bits with at least one of the plurality of bits being configured to indicate whether the current subframe comprises a beginning subframe or an ending subframe while remaining bits indicate a partial subframe length of the partial subframe of the downlink transmission, wherein, in response to the current subframe comprising a non-beginning subframe or a non-ending subframe, the remaining bits of the plurality of bits indicate the second length of the subsequent subframe, and in response to the current subframe comprising the beginning subframe or the ending subframe, the remaining bits of the plurality of bits indicate the first length of the current subframe, and in response to the plurality of bits or a control information not being present, a regular subframe is indicated.

Example 12 is a computer-readable storage medium storing executable instructions that, in response to execution, cause a processor of an evolved NodeB ("eNB") to perform operations, comprising: generating, via the processor, a channel assessment on a channel of an unlicensed carrier by performing a listen before talk ("LBT") protocol; and providing a downlink transmission in the unlicensed carrier based on the channel assessment after a random duration within a predetermined interval.

Example 13 includes the subject matter of Example 12, wherein the operations further comprise: providing downlink control information ("DCI") indicating a first length of a current subframe and a second length of a subsequent subframe in a plurality of subframes of the downlink transmission and enable a determination that identifies between a regular subframe and a partial subframe of the plurality of subframes, wherein the predetermined interval comprises a time between an ending of the LBT protocol and an aligned starting position for regular subframes of downlink transmissions.

Example 14 includes the subject matter of any of Examples 12-14, including or omitting any elements, wherein the DCI is within a PDCCH of the downlink transmission, comprises a plurality of bits with at least one of the plurality of bits being configured to indicate whether the current subframe comprises a beginning subframe or an ending subframe while remaining bits indicate a partial subframe length of the partial subframe of the downlink transmission; and wherein, in response to the current subframe comprising a non-beginning subframe or a non-ending subframe, the remaining bits of the plurality of bits indicate the second length of the subsequent subframe.

Example 15 includes the subject matter of any of Examples 12-15, including or omitting any elements, wherein the operations further comprise: generating the downlink transmission with a partial subframe at a beginning or an end of the downlink transmission, and the partial subframe comprises a plurality of orthogonal frequency division multiplexing symbols ("OFDM") less than or equal to a regular subframe.

Example 16 includes the subject matter of any of Examples 12-15, including or omitting any elements, wherein the operations further comprise: providing an indication comprising at least one of a starting position, one or more durations of the partial subframe as a beginning subframe, an ending subframe or both durations, or a different duration of a subsequent subframe, based on a blind detection of a total number of OFDM symbol and a plurality of positions of OFDM symbols of a cell-specific reference signal ("CRS"), an enhanced physical downlink control channel ("(E)PDCCH"), a downlink control information ("DCI") or a physical control format indicator channel ("PCFICH") within the partial subframe or a regular subframe to enable a user equipment ("UE") to independently differentiate between the regular subframe and the partial subframe based on the blind detection.

Example 17 includes the subject matter of any of Examples 12-16, including or omitting any elements, wherein the operations further comprise: generating an indication of a starting position or an ending position of the downlink transmission within a starting partial subframe or an ending partial subframe, respectively; wherein the indication is generated with a number of symbols of a length of a corresponding subframe within a plurality of subframes of the downlink transmission and a subsequent subframe of the plurality of subframes, wherein a total number of OFDM symbols within the downlink transmission is indicated in a first subframe only, or wherein the total number of OFDM symbols remaining within the downlink transmission is indicated in every subframe or in a subset of the plurality of subframes within the downlink transmission.

Example 18 includes the subject matter of any of Examples 12-17, including or omitting any elements, wherein the operations further comprise: inserting the indication in a CRS by modifying an initial value of a pseudo-random sequence generator for generation of the CRS.

Example 19 includes the subject matter of any of Examples 12-18, including or omitting any elements, wherein the operations further comprise: modifying a DCI by reusing existing downlink DCI and scrambling cyclic redundancy check ("CRC") based on an licensed assisted access cell-radio network temporary identifiers ("LAA-RNTI"), wherein a search space comprises a common or UE-group search space.

Example 20 includes the subject matter of any of Examples 12-19, including or omitting any elements, wherein the modified DCI comprises additional fields to carry the indication to existing DL DCI, and scrambling CRC by the LAA-RNTI to indicate the modified DCI.

Example 21 is an apparatus employed in a user equipment ("UE") operating in an unlicensed spectrum comprising: a radio frequency ("RF") circuitry component configured to transmit or receive communication signals on the unlicensed spectrum; and processor, coupled to the RF circuitry component, configured to process a downlink transmission comprising one or more partial subframes at a starting subframe or an ending subframe of a plurality of subframes within a random duration of a time between an ending of a listen before talk ("LBT") protocol and an aligned position for regular subframes of downlink transmissions.

Example 22 includes the subject matter of Example 21, wherein the processor is further configured to process downlink control information ("DCI") indicating a first length of a current subframe and a second length of a subsequent subframe in the downlink transmission and differentiate between a regular subframe and a partial subframe among the plurality of subframes of the downlink transmission, wherein the DCI is process from within a physical downlink control channel ("PDCCH") of the downlink transmission, comprises a plurality of bits with at least one of the plurality of bits being configured to indicate whether the current subframe comprises a beginning subframe or an ending subframe while remaining bits indicate a partial subframe length of the partial subframe of the downlink transmission.

Example 23 includes the subject matter of any of Examples 21-22, including or omitting any elements, wherein, in response to the current subframe comprising a non-beginning subframe or a non-ending subframe, the remaining bits of the plurality of bits indicate the second length of the subsequent subframe, and in response to the current subframe comprising the beginning subframe or the ending subframe, the remaining bits of the plurality of bits indicate the first length of the current subframe.

Example 24 includes the subject matter of any of Examples 21-23, including or omitting any elements, wherein the processor is further configured to process an indication of a starting position, one or more durations of the one or more partial subframes as a beginning subframe, an ending subframe, or a different duration of a subsequent subframe, based on a blind detection of a total number of orthogonal frequency division multiplexing symbols ("OFDM") and a plurality of positions of OFDM symbols of a cell-specific reference signal ("CRS"), an enhanced physical downlink control channel ("(E)PDCCH"), a downlink control information ("DCI") or a physical control format indicator channel ("PCFICH") within a partial subframe or a regular subframe to independently differentiate between the regular subframe and the one or more partial subframes.

Example 25 includes the subject matter of any of Examples 21-24, including or omitting any elements, wherein the processor is further configured to process indication information within at least one subframe of the plurality of subframes within the downlink transmission to determine whether the at least one subframe is a normal or a partial subframe, and, in response to the at least one subframe comprising the partial subframe as an ending partial subframe, determining at least one of possible ending positions of the ending partial subframe based on the indication information.

Example 26 includes the subject matter of any of Examples 21-25, wherein the processor is further configured to process indication information of an ending position of the downlink transmission within an ending partial subframe, determine a length of a corresponding subframe and a subsequent subframe within the plurality of subframes of the downlink transmission.

Example 27 includes the subject matter of any of Examples 21-26, wherein a total number of OFDM symbols within the downlink transmission are indicated in a first subframe, or wherein the total number of OFDM symbols remaining within the downlink transmission is indicated in every subframe or a subset of the plurality of subframes within the downlink transmission.

Example 28 includes the subject matter of any of Examples 21-27, wherein the processor is further configured to determine at least one of an ending position or a duration of a partial subframe of the downlink transmission based on a DCI and determine the DCI by descrambling cyclic redundancy check ("CRC") based on an licensed assisted access cell-radio network temporary identifiers ("LAA-RNTI"), wherein a search space comprises a common search space or a UE-group search space.

Example 29 is an apparatus configured to be employed within an evolved NodeB (eNB) comprising: means for generating a channel assessment on a channel of an unlicensed carrier by performing a listen before talk ("LBT") protocol; and means for providing a downlink transmission in the unlicensed carrier based on the channel assessment after a random duration within a predetermined interval.

Example 30 includes the subject matter of Example 29, further comprising: means for providing downlink control information ("DCI") indicating a first length of a current subframe and a second length of a subsequent subframe in a plurality of subframes of the downlink transmission and enable a determination that identifies between a regular subframe and a partial subframe of the plurality of subframes, wherein the predetermined interval comprises a time between an ending of the LBT protocol and an aligned starting position for regular subframes of downlink transmissions.

Example 31 includes the subject matter of any of Examples 29-30, wherein the DCI is within a PDCCH of the downlink transmission, comprises a plurality of bits with at least one of the plurality of bits being configured to indicate whether the current subframe comprises a beginning subframe or an ending subframe while remaining bits indicate a partial subframe length of the partial subframe of the downlink transmission; and wherein, in response to the current subframe comprising a non-beginning subframe or a non-ending subframe, the remaining bits of the plurality of bits indicate the second length of the subsequent subframe.

Example 32 includes the subject matter of any of Examples 29-31, further comprising: generating the downlink transmission with a partial subframe at a beginning or an end of the downlink transmission, and the partial subframe comprises a plurality of orthogonal frequency division multiplexing symbols ("OFDM") less than or equal to a regular subframe.

Example 33 includes the subject matter of any of Examples 29-32, further comprising: means for providing an indication comprising at least one of a starting position, one or more durations of the partial subframe as a beginning subframe, an ending subframe or both durations, or a different duration of a subsequent subframe, based on a blind detection of a total number of OFDM symbol and a plurality of positions of OFDM symbols of a cell-specific reference signal ("CRS"), an enhanced physical downlink control channel ("(E)PDCCH"), a downlink control information ("DCI") or a physical control format indicator channel ("PCFICH") within the partial subframe or a regular subframe to enable a user equipment ("UE") to independently differentiate between the regular subframe and the partial subframe based on the blind detection.

Example 34 includes the subject matter of any of Examples 29-33, further comprising: means for generating an indication of a starting position or an ending position of the downlink transmission within a starting partial subframe or an ending partial subframe, respectively; wherein the indication is generated with a number of symbols of a length of a corresponding subframe within a plurality of subframes of the downlink transmission and a subsequent subframe of the plurality of subframes, wherein a total number of OFDM symbols within the downlink transmission is indicated in a first subframe only, or wherein the total number of OFDM symbols remaining within the downlink transmission is indicated in every subframe or in a subset of the plurality of subframes within the downlink transmission.

Example 35 includes the subject matter of any of Examples 29-34, further comprising: means for inserting the indication in a CRS by modifying an initial value of a pseudo-random sequence generator for generation of the CRS.

Example 36 includes the subject matter of any of Examples 29-35, further comprising: means for modifying a DCI by reusing existing downlink DCI and scrambling cyclic redundancy check ("CRC") based on an licensed assisted access cell-radio network temporary identifiers ("LAA-RNTI"), wherein a search space comprises a common or UE-group search space.

Example 37 includes the subject matter of any of Examples 29-36, wherein the modified DCI comprises additional fields to carry the indication to existing DL DCI, and scrambling CRC by the LAA-RNTI to indicate the modified DCI.

Example 38 is an apparatus configured to be employed within an evolved NodeB (eNB), comprising: a processor configured to: process or generate communication signals on an unlicensed spectrum; and generate a clear channel assessment of one or more secondary cell network devices by performing a listen before talk protocol to detect whether a channel of the one or more second cell network devices is busy or idle, and in response to the detecting the channel of the one or more second cell network devices is idle, generate a downlink transmission via the channel in the unlicensed spectrum after a random duration that is specified within a predetermined interval of the downlink transmission.

Example 39 is an apparatus employed in a user equipment ("UE") operating in an unlicensed spectrum comprising: a processor configured to: transmit or receive communication signals on the unlicensed spectrum; and process a downlink transmission comprise one or more partial subframes at a starting subframe or an ending subframe of a plurality of subframes within a random duration within a time between an ending of a listen before talk ("LBT") protocol and an aligned position for regular subframes of downlink transmissions.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature may have been disclosed with respect to only one of several implementations, such feature may be combined with one or more other features of the other implementations as may be desired and advantageous for any given or particular application.

What is claimed is:

1. An apparatus of a base station, the apparatus comprising:
    a radio frequency ("RF") circuitry component configured to process or generate communication signals in an unlicensed spectrum; and
    a baseband component, coupled to the RF circuitry component, configured to:
        perform listen before talk ("LBT") to detect whether a channel of one or more second cells is busy or idle, and
        in response to detecting the channel to be idle, perform a downlink transmission via the channel of the unlicensed spectrum,
    wherein
        the downlink transmission includes a physical downlink control channel (PDCCH) comprising a four-bit field indicating whether one or more of a current subframe and a next subframe are normal or partial subframes,
        when a partial subframe is indicated,
            the four-bit field indicates a length in symbols for the partial subframe, and
        at least one configuration of the four-bit field enables indication of the current subframe being a normal subframe and an ending subframe of the transmission.

2. The apparatus of claim 1, wherein:
    the partial subframe comprises a beginning of the downlink transmission or the partial subframe comprises an end of the downlink transmission, and wherein:
        the at least one of the partial subframe comprises a plurality of orthogonal frequency division multiplexing symbols ("OFDM") less than or equal to a regular Long Term Evolution (LTE) subframe.

3. The apparatus of claim 1, wherein the baseband component is further configured to:
    indicate at least one of a starting position or a duration of a starting partial subframe based on a blind detection of an enhanced physical downlink control channel ("(E)PDCCH") within the starting partial subframe, or based on a downlink control information ("DCI") or physical control format indicator channel ("PCFICH") transmitted within the starting partial subframe or a subsequent regular subframe.

4. The apparatus of claim 1, wherein the baseband component is further configured to:
    indicate at least one of an ending position or a duration of an ending partial subframe based on a blind detection of a number of symbols and a plurality of positions of OFDM symbols with a cell-specific reference signals (CRS) sequence to enable a UE to independently differentiate between a regular subframe and the ending partial subframe, or based on a DCI or a PCFICH transmission within the ending partial subframe or within the regular subframe of the downlink transmission, and in response to the CRS not being modified to indicate a partial subframe presence, the UE considers the subframe as a regular subframe.

5. A non-transitory computer-readable storage medium storing executable instructions that, in response to execution, cause a processor of a base station to perform operations, comprising:
    perform, on a channel of an unlicensed carrier, listen before talk ("LBT"); and
    provide a downlink transmission in the unlicensed carrier based on a channel assessment,
    wherein:
        the downlink transmission includes a physical downlink control channel (PDCCH) comprising a four-bit field indicating whether one or more of a current subframe and a next subframe are normal or partial subframes,
        when a partial subframe is indicated,
            the four-bit field indicates a length in symbols for the partial subframe, and
        at least one configuration of the four-bit field enables indication of the current subframe being a normal subframe and an ending subframe of the downlink transmission.

6. The non-transitory computer-readable storage medium of claim 5, wherein the operations further comprise:
provide downlink control information ("DCI") indicating a first length of a current subframe and a second length of a subsequent subframe in a plurality of subframes of the downlink transmission, and
enable a determination that identifies between a regular subframe and a partial subframe of the plurality of subframes.

7. The non-transitory computer-readable storage medium of claim 6, wherein the DCI is within a PDCCH of the downlink transmission and comprises:
a plurality of bits with at least one of the plurality of bits being configured to indicate:
whether the current subframe comprises:
a beginning subframe, or
an ending subframe,
while remaining bits, of the plurality of bits, indicate a partial subframe length of the partial subframe of the downlink transmission;
wherein, in response to the current subframe comprising a non-beginning subframe or a non-ending subframe,
the remaining bits of the plurality of bits, indicate the second length of the subsequent subframe.

8. The non-transitory computer-readable storage medium of claim 5, wherein:
the operations further comprise generate the downlink transmission with a partial subframe at a beginning or an end of the downlink transmission, and
the partial subframe comprises a plurality of orthogonal frequency division multiplexing symbols ("OFDM") less than or equal to a regular subframe.

9. The non-transitory computer-readable storage medium of claim 8, wherein the operations further comprise:
provide an indication comprising at least one of a starting position, one or more durations of the partial subframe as a beginning subframe, an ending subframe or both durations, or a different duration of a subsequent subframe, based on a blind detection of a total number of OFDM symbol and a plurality of positions of OFDM symbols of a cell-specific reference signal ("CRS"), an enhanced physical downlink control channel ("(E) PDCCH"), a downlink control information ("DCI") or a physical control format indicator channel ("PC-FICH") within the partial subframe or a regular subframe to enable a user equipment ("UE") to independently differentiate between the regular subframe and the partial subframe based on the blind detection.

10. The non-transitory computer-readable storage medium of claim 8, wherein the operations further comprise:
generate an indication of a starting position or an ending position of the downlink transmission within a starting partial subframe or an ending partial subframe, respectively,
wherein:
the indication is generated with a number of symbols of a length of a corresponding subframe within a plurality of subframes of the downlink transmission and a subsequent subframe of the plurality of subframes,
a total number of OFDM symbols within the downlink transmission is indicated in a first subframe only, or
the total number of OFDM symbols remaining within the downlink transmission is indicated in every subframe or in a subset of the plurality of subframes within the downlink transmission.

11. The non-transitory computer-readable storage medium of claim 8, wherein the operations further comprise:
modify a DCI by reusing existing downlink DCI and scrambling cyclic redundancy check ("CRC") based on a licensed assisted access cell-radio network temporary identifiers ("LAA-RNTI"),
wherein a search space comprises a common or UE-group search space.

12. The non-transitory computer-readable storage medium of claim 11, wherein the modified DCI comprises additional fields to carry an indication to existing DL DCI, and scrambling CRC by the LAA-RNTI to indicate the modified DCI.

13. The apparatus of claim 1, wherein a first bit, of the four-bit field, indicates whether the current subframe is a normal subframe regarding the downlink transmission.

14. The apparatus of claim 13, wherein,
when the current subframe is a normal subframe,
a last three bits, of the four-bit field, indicate a quantity of symbols occupied in the next subframe.

15. The apparatus of claim 13, wherein,
when the current subframe is a normal subframe,
each combination of a last three bits, of the four-bit field, indicate a different quantity of symbols occupied in the next subframe.

16. The apparatus of claim 13, wherein,
when the current subframe is a partial subframe,
a last three bits, of the four-bit field, indicate a quantity of symbols occupied in the current subframe.

17. The apparatus of claim 13, wherein,
when the current subframe is a partial subframe,
different combinations of a last three bits, of the four-bit field, indicate different quantities of symbols occupied in the current subframe.

18. The apparatus of claim 13, wherein the four-bit field comprises a subframe configuration for licensed assisted access (LAA) field.

19. The apparatus of claim 13, wherein normal subframes comprises fourteen orthogonal frequency division multiplexing (OFDM) symbols occupied per subframe.

20. The apparatus of claim 13, wherein partial subframes comprises less than fourteen orthogonal frequency division multiplexing (OFDM) symbols occupied per subframe.

21. An apparatus of a User Equipment (UE), the apparatus comprising:
radio frequency ("RF") circuitry configured to process or generate communication signals in an unlicensed spectrum; and
a baseband component, coupled to the RF circuitry, configured to:
receive, via the RF circuitry and unlicensed spectrum, a downlink transmission; and
process the downlink transmission as a communication from a base station, wherein:
the downlink transmission includes a physical downlink control channel (PDCCH) comprising a four-bit field indicating whether one or more of a current subframe and a next subframe are normal or partial subframes,
when a partial subframe is indicated,
the four-bit field indicates a length in symbols for the partial subframe, and
at least one configuration of the four-bit field enables indication of the current subframe being a normal subframe and an ending subframe of the transmission.

22. The apparatus of claim 21, wherein a first bit, of the four-bit field, indicates whether the current subframe is a normal subframe regarding the downlink transmission.

23. The apparatus of claim 22, wherein,
when the current subframe is a normal subframe,
a last three bits, of the four-bit field, indicate a quantity of symbols occupied in the next subframe.

24. The apparatus of claim 22, wherein,
when the current subframe is a normal subframe,
each combination of a last three bits, of the four-bit field, indicate a different quantity of symbols occupied in the next subframe.

25. The apparatus of claim 22, wherein,
when the current subframe is a partial subframe,
a last three bits, of the four-bit field, indicate a quantity of symbols occupied in the current subframe.

26. The apparatus of claim 22, wherein,
when the current subframe is a partial subframe,
different combinations of a last three bits, of the four-bit field, indicate different quantities of symbols occupied in the current subframe.

27. The apparatus of claim 22, wherein the four-bit field comprises a subframe configuration for licensed assisted access (LAA) field.

28. The apparatus of claim 22, wherein normal subframes comprises fourteen orthogonal frequency division multiplexing (OFDM) symbols occupied per subframe.

29. The apparatus of claim 22, wherein partial subframes comprises less than fourteen orthogonal frequency division multiplexing (OFDM) symbols occupied per subframe.

\* \* \* \* \*